US008900350B2

(12) United States Patent
Suzuki et al.

(10) Patent No.: US 8,900,350 B2
(45) Date of Patent: Dec. 2, 2014

(54) SEPARATION MEMBRANE MODULE AND FUEL VAPOR PROCESSING APPARATUS INCORPORATING THE SAME

(71) Applicant: Aisan Kogyo Kabushiki Kaisha, Obu-shi, Aichi-ken (JP)

(72) Inventors: Masataka Suzuki, Obu (JP); Takashi Suefuji, Obu (JP); Akio Muraishi, Obu (JP); Katsuhiko Makino, Obu (JP); Toshiyuki Iwasaki, Obu (JP); Takashi Mani, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 0 days.

(21) Appl. No.: 13/743,496

(22) Filed: Jan. 17, 2013

(65) Prior Publication Data

US 2013/0125755 A1    May 23, 2013

Related U.S. Application Data

(62) Division of application No. 12/588,781, filed on Oct. 28, 2009, now Pat. No. 8,388,743.

(30) Foreign Application Priority Data

Oct. 30, 2008   (JP) ................................. 2008-279927
Nov. 18, 2008   (JP) ................................. 2008-294289

(51) Int. Cl.
*B01D 53/22*    (2006.01)

(52) U.S. Cl.
USPC ......... 96/4; 96/6; 96/7; 96/8; 96/134; 96/143; 96/417; 96/422; 95/1; 95/8; 95/12; 95/23; 95/50; 95/146; 123/518; 123/519

(58) Field of Classification Search
USPC .......... 96/4, 7, 8, 134, 143, 417, 422, 6; 95/1, 95/8, 12, 23, 50, 143, 146; 123/516, 518, 123/519, 520
See application file for complete search history.

(56) References Cited

U.S. PATENT DOCUMENTS

| | | | |
|---|---|---|---|
| 6,772,740 B2 * | 8/2004 | Kojima et al. ............... | 123/519 |
| 8,336,527 B2 * | 12/2012 | Aso et al. ...................... | 123/519 |
| 2003/0121830 A1 * | 7/2003 | Kuroyanagi et al. ......... | 208/348 |
| 2003/0196645 A1 * | 10/2003 | Kojima et al. ............... | 123/520 |
| 2010/0252005 A1 * | 10/2010 | Kitamoto et al. ............. | 123/518 |

* cited by examiner

FOREIGN PATENT DOCUMENTS

| | | |
|---|---|---|
| JP | 63-73193 | 5/1988 |
| JP | 2008-173545 | 7/2008 |

OTHER PUBLICATIONS

Japanese Patent Office Action dated Dec. 18, 2012, and English translation.

*Primary Examiner* — Jason M Greene
(74) *Attorney, Agent, or Firm* — Ladas & Parry LLP

(57) ABSTRACT

One aspect of the present teachings includes a separation membrane arranged in a hollow case. A particular component concentration chamber and a particular component dilution chamber are arranged in series in the hollow case. The particular component concentration chamber is capable of increasing concentration of the particular component by allowing permeation of the particular gas through the separation membrane. The particular component dilution chamber is capable of increasing concentration of the particular component by not allowing permeation of the particular gas through the separation membrane. The particular component concentration chamber and the particular component dilution chamber are configured such that only a gas containing the particular component and permeated through the separation membrane or only a gas containing the particular component not permeated through the separation membrane in one of the chambers disposed on an upstream side (i.e., the side of the inlet port) can flow into the other of the chambers.

10 Claims, 16 Drawing Sheets

SEPARATION MEMBRANE MODULE AND FUEL VAPOR PROCESSING APPARATUS INCORPORATING THE SAME

INCORPORATING THE SAME

This application claims priority to Japanese patent application serial number 2008-279927 and 2008-294289, the contents of which are incorporated herein by reference.

BACKGROUND OF THE INVENTION

Field of the Invention

The present invention relates to a separation membrane module including a separation membrane for separation of a gas, which contains a particular component, into a high concentration gas, which contains the particular component at a high concentration, and a low concentration gas, which contains the particular component at a low concentration. The present invention also relates to a fuel vapor processing apparatus using the same.

Separation membranes capable of separating and concentrating a particular component from a gaseous mixture by using a difference in solution and diffusion coefficient for a high polymer membrane have been applied in various industrial fields. For example, separation membranes have been applied in many fields for separation of oxygen and nitrogen from an air, separation and recovery of hydrogen from offgas in the Platforming process, separation and recovery of hydrogen in synthesis of ammonia, recovery of carbon dioxide and removal of nitrogen oxides and sulfur oxides from exhaust gases produced in steam power generation and garbage incineration, separation and recovery of carbon dioxide from off-gas in oil fields, removal of sour gases such as hydrogen sulphide, carbon dioxide, etc. and separation and recovery of helium from natural gas having methane as a main component, dehumidification of an air for precision instrument and an ozone generator, dehydration from organic solvents, separation and recovery of a fuel vaporizing from a fuel vapor containing gas generated from a gasoline fuel, and so on. As one configuration of a separation membrane, there has been proposed hollow yarn membranes as disclosed in JP-A-63-315104, JP-A-9-66224, and JP-A-2008-173573. While objects being separated are different in these publications, the hollow yarn membranes have a fundamental construction, in which a functional layer formed from a non-porous, high polymer membrane is laminated on a surface of a porous, hollow yarn shaped support medium. In the case that the hollow yarn membrane is modulated, the hollow yarn membrane is provided inside a hollow case, which includes an inlet port and an discharge port but has no permeability.

On the other hand, fuel vapor processing apparatuses incorporating a purgeless evaporative system have been developed for concentration, separation and recovery of fuel vapor into a fuel tank from a fuel vapor containing gas generated from a gasoline fuel by using a separation membrane module. Such fuel vapor processing apparatus is described in, for example, JP-A-2004-332694 and JP-A-2003-314381. In these documents, there are provided a canister for adsorption and collection of fuel vapor generating from a fuel tank, a separation membrane module for separation of a fuel vapor containing gas, which contains fuel vapor desorbed from the canister, into a high concentration gas containing the fuel vapor at a high concentration and a low concentration gas containing the fuel vapor at a low concentration, and a pump, which pressure-feeds the fuel vapor containing gas to the separation membrane module from the canister. A membrane used as the separation membrane is a fuel vapor concentration membrane, through which a fuel component is preferentially permeated due to a difference in solution and diffusion coefficient and through which an air component is hard to be permeated. The fuel vapor concentration membrane separates a fuel vapor containing gas into a high concentration gas (concentrated gas) on a permeation side and a low concentration gas (diluted gas) on a non-permeation side. Further, two fuel vapor concentration membranes are provided in series to concentrate a fuel vapor containing gas in two stages. Specifically, a high concentration gas permeated through a first fuel vapor concentration membrane is recovered into a fuel tank and a medium concentration gas not permeated through the first fuel vapor concentration membrane is fed to a second fuel vapor concentration membrane. The concentration gas permeated through the second fuel vapor concentration membrane is refluxed again to the first fuel vapor concentration membrane while a low concentration gas not permeated through the second fuel vapor concentration membrane is returned to the canister. Therefore, fuel vapor recovery efficiency is improved.

Also, JP-A-9-66217 discloses a gas separation method, in which two kinds of separation membranes, that is, a particular component concentration membrane with high permeation coefficient for, a particular component and a particular component dilution membrane with low permeation coefficient of the particular component are provided in series to perform a multistage separation process in the case that a particular component such as an isoprene gas is to be recovered by separation from the other components of a mixed gas containing three or more evaporative components, such as naphtha light distillates, originated from petroleum.

Hollow yarn membranes disclosed in JP-A-63-315104, JP-A-9-66224, and JP-A-2008-173573 are aimed to allow permeation of a particular component for the purpose of concentration and separation and include a single kind of a functional layer laminated on a surface of a hollow yarn (support medium). That is, a single hollow yarn membrane has only a separation function of a single component. Accordingly, in order to separate and recover some components from a mixed gas containing a plurality of components, it is necessary to prepare a plurality of separation membranes, which are different in objects of separation, and to make sequential permeation. According to the disclosure of JP-A-2004-332694, JP-A-2003-314381, and JP-A-9-66217, a combination of a plurality of particular component separation membrane modules and another particular component separation membrane, or a combination of particular component separation membrane modules and another particular component separation membrane module, in which the separation membrane modules are arranged in series through a communication pipe(s) that feeds a fuel vapor containing gas or a mixed gas sequentially to the separation membrane modules to achieve separation in plural stages.

However, such arrangement involves various problems such as problems that the size of an apparatus is large, the number of assembling steps of the apparatus and the number of parts are increased, lightening of the apparatus is difficult, many piping joints are required to increase the possibility of gas leakage from the piping joints, and the cost is increased.

Therefore, there is a need in the art to provide a separation membrane module that does not increase in size even in the case that separation and concentration of a particular component containing gas is performed in plural stages to recover the particular component. There is also a need for a fuel vapor processing apparatus having such a separation membrane module.

SUMMARY OF THE INVENTION

One aspect of the present teachings includes a separation membrane arranged in a hollow case. A particular component concentration chamber and a particular component dilution chamber are arranged in series in the hollow case. The particular component concentration chamber is capable of increasing concentration of the particular component by allowing permeation of the particular gas through the separation membrane. The particular component dilution chamber is capable of increasing concentration of the particular component by not allowing permeation of the particular gas through the separation membrane. The particular component concentration chamber and the particular component dilution chamber are configured such that only a gas containing the particular component and permeated through the separation membrane or only a gas containing the particular component not permeated through the separation membrane in one of the chambers disposed on an upstream side (i.e., the side of the inlet port) can flow into the other of the chambers.

DETAILED DESCRIPTION OF THE INVENTION

Figure 1:
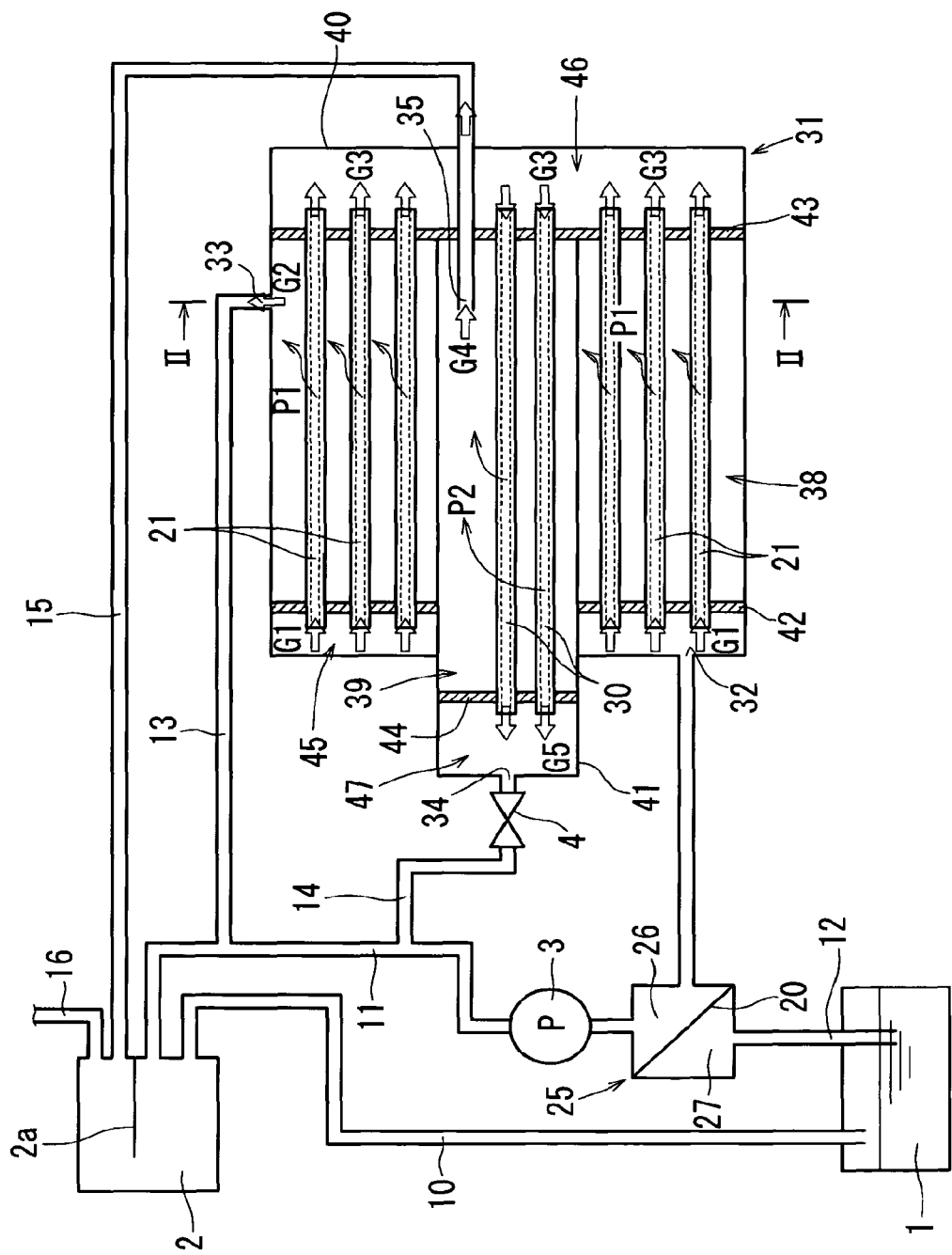
FIG. 1 is a view showing a schematic configuration of a fuel vapor processing apparatus according to Embodiment 1

Each of the additional features and teachings disclosed above and below may be utilized separately or in conjunction with other features and teachings to provide improved separation membrane modules and fuel vapor processing apparatus incorporating the separation membrane modules. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a separation membrane includes a hollow case having no gas permeability and including an inlet port and a plurality of discharge ports. A separation membrane is arranged in the hollow case and is capable of separating a particular component containing gas into a high concentration gas containing a particular component at a high concentration, and a low concentration gas containing the particular component at a low concentration. A particular component concentration chamber and a particular component dilution chamber are arranged in series in the hollow case. The particular component concentration chamber is capable of increasing concentration of the particular component by allowing permeation of the particular gas through the separation membrane. The particular component dilution chamber is capable of increasing concentration of the particular component by not allowing permeation of the particular gas through the separation membrane. The particular component concentration chamber and the particular component dilution chamber are configured such that only a gas containing the particular component and permeated through the separation membrane or only a gas containing the particular component not permeated through the separation membrane in one of the chambers disposed on an upstream side (i.e., the side of the inlet port) can flow into the other of the chambers. The number of the discharge ports is set to correspond to the number of gases to be separated and refined in the particular component concentration chamber and the particular component dilution chamber, so that the gases separated and refined in the particular component concentration chamber and the particular component dilution chamber are discharged separately.

With the separation membrane module or a fuel vapor processing apparatus provided with the separation membrane module, the particular component concentration chamber and the particular component dilution chamber are arranged in series in the hollow case, so that a plurality of separation membranes can be integrated into a single module. With such construction, it is only necessary to use a single separation membrane module even in case of separating and recovering a particular component containing gas in a plurality of stages. Therefore, downsizing of the apparatus, reduction in assembling steps of the apparatus and the number of parts, lightening of the apparatus, decrease in cost, etc. are possible. Further since piping joints are reduced in number, the possibility of gas leakage from the piping joints is lowered. Because the particular component concentration chamber and the particular component dilution chamber are configured such that only a gas containing the particular component and permeated through the separation membrane or only a gas containing the particular component not permeated through the separation membrane in one of the chambers disposed on an upstream side can flow into the other of the chambers, the separated gases may not be mixed with each other and separation in a plurality of stages is ensured even in the case that a plurality of separation membranes are integrated into a single module. The number of the at least two discharge port is set to correspond to the number of gases to be separated and refined in the particular component concentration chamber and the particular component dilution chamber, so that the gases separated and refined in the particular component concentration chamber and the particular component dilution chamber are discharged separately. Therefore, the separated gases can be surely supplied to desired destinations of supply, so that a fuel vapor processing apparatus incorporating the separation membrane module is improved in freedom of design.

The separation membrane module may further include a compartment wall separating the particular component concentration chamber and the particular component dilution chamber from each other and extending in parallel to the separation membrane. The separation membrane includes a particular component concentration membrane and a particular component dilution membrane. The particular component concentration membrane is arranged in the particular component concentration chamber and is capable of increasing concentration of the particular gas by allowing permeation of the particular gas therethrough. The particular component dilution chamber is arranged in the particular component dilution chamber and is capable of increasing concentration of the particular gas by not allowing permeation of the particular gas therethrough.

By providing the compartment wall extending in parallel to the separation membrane and separating the particular component concentration chamber having the particular component dilution membrane provided therein and the particular component dilution chamber having the particular component dilution chamber provided from each other, it is possible to easily integrate a plurality of separation membranes into a single module without influence on functions of the respective separation membranes.

The hollow case may include a large diameter case and at least one small diameter case disposed within the large diameter case to form a plurality of spaces arranged in a radial direction within the hollow case. The at least one of the plurality of spaces arranged in the radial direction may defines the particular component concentration chamber and at least one of the remaining spaces may define the particular component dilution chamber. In the case of this configuration, a hollow yarn membrane or a flat membrane may be used as the separation membrane.

By disposing the small diameter case(s) within a large diameter and providing a plurality of spaces arranged in a radial direction, it is possible to keep wide, inner spaces of the respective cases, so that an improvement in spatial freedom is achieved. Also, such construction is improved in versatility since it is possible to use both a hollow yarn membrane and a flat membrane as the separation membrane.

In another configuration, the separation membrane module may include a compartment wall separating the particular component concentration chamber and the particular component dilution chamber and extending in a direction intersecting the separation membrane. The separation membrane may include a hollow yarn membrane including a porous, hollow-yarn like support medium and a functional layer formed of a non-porous polymer membrane and laminated on an inner surface or an outer surface of the support medium. The functional layer may include a concentration functional layer and a dilution functional layer laminated on the support membrane. The concentration functional layer is capable of increasing concentration of the particular component by allowing permeation of the particular gas therethrough. The particular component dilution chamber is capable of increasing concentration of the particular component by not allowing permeation of the particular gas through the separation membrane. The particular component concentration chamber and the particular component dilution chamber may communicate with each other through a space defined within the hollow yarn membrane.

Also with this configuration, it is possible to easily integrate a plurality of separation membranes, which are different in function, into a single module without influence on functions of the respective separation membranes. In this case, by laminating the concentration functional layer and the dilution functional layer at different locations on the single support medium (the hollow yarn), downsizing is further possible as compared with, for example, the case where the hollow case is of an internal and external, dual structure.

In another embodiment, the above separation membrane module may be incorporated into a fuel vapor processing apparatus including a canister capable of adsorbing and collecting a fuel vapor produced within a fuel tank, a separation device capable of separating of a fuel vapor containing gas containing the fuel vapor desorbed from the canister into a high concentration gas containing the fuel vapor at a high concentration and a low concentration gas containing the fuel vapor at a low concentration, and a pressure-feed capable of pressure feeding the fuel vapor containing gas from the canister to the separation device.

In a further embodiment of the present teachings, that may be incorporated in combination with the embodiments or configurations described above or independently thereof, a fuel vapor processing apparatus includes a canister capable of adsorbing and collecting a fuel vapor produced within a fuel tank, a separation membrane module capable of selectively permeating and separating a fuel component from a fuel vapor containing gas containing the fuel vapor desorbed from the canister, a gas supply device capable of pressure-feeding the fuel vapor containing gas from the canister to the separation membrane, and an electronic control unit capable of controlling a ratio of the flow rate of the fuel vapor containing gas supplied to the separation membrane to a flow rate of a gas permeated through the separation membrane module is equal to or larger than 7, preferably 7 to 20, and more preferably 7 to 10. The fuel vapor containing gas supplied to the separation membrane (hereinafter called as "supplied gas") may contain a fuel vapor desorbed from the canister. The flow rate of the supplied gas can be controlled by using the electronic control unit to control an output of the gas supply device, a flow rate regulator provided separately of the gas supply device, etc. The ratio of the flow rate of the fuel vapor containing gas supplied to the separation membrane to the flow rate of the gas permeated through the separation membrane module (flow rate of supplied gas/flow rate of permeated gas) may be called as "stage cut."

According to this arrangement, the flow rate of supplied gas is controlled so that a stage cut, that is, (flow rate of supplied gas/flow rate of permeated gas) is set to be at least 7, so that the processing capacity of the separation membrane can be maximally increased and an improvement in recovery efficiency of a fuel vapor is achieved. In the case that the flow rate of the supplied gas is controlled so that the stage cut is 7 to 20, more preferably, 7 to 10, the flow rate of supplied gas can be restricted while the processing capacity of the separation membrane can be maximized, and therefore, so that it is possible to effectively reduce the energy cost.

The control of the flow rate of supplied gas can be performed in the following different ways. According to a first way, a supplied gas concentration detecting device is provided between the canister and the separation membrane and is capable of detecting the concentration of the fuel vapor contained in the fuel vapor containing gas supplied to the separation membrane. The electronic control unit stores therein data relating to permeability (hereinafter also called "permeability data") and corresponding to the concentration of the fuel vapor contained in the supplied fuel vapor containing gas. The electronic control unit controls the flow rate of the supplied fuel vapor containing gas on the basis of the concentration of the fuel vapor detected by the supplied gas concentration detecting device and the permeability data.

According to a second way, a permeated gas concentration detecting device is provided between the separation membrane and the fuel tank. The permeated gas concentration detecting device is capable of detecting the concentration of the fuel vapor contained in a gas permeated through the separation membrane. The electronic control unit stores therein permeability data corresponding to the concentration of the fuel vapor contained in the permeated gas. The electronic control unit controls the flow rate of the fuel vapor containing gas supplied to the separation membrane on the basis of permeability data and the concentration of the fuel vapor detected by the permeated gas concentration detecting device.

According to a third way, a permeated gas flow rate detecting device is provided between the separation membrane and the fuel tank. The permeated gas flow rate detecting device is capable of detecting the flow rate of the permeated gas. The electronic control unit stores therein permeability data corresponding to the flow rate of the permeated gas. The electronic control unit controls the flow rate of the fuel vapor containing gas supplied to the separation membrane on the basis of permeability data and the flow rate of the permeated gas detected by the permeated gas flow rate detecting device.

Here, the data relating to permeability or permeability data means data of flow rate of the permeated gas, data of concentration of the permeated gas or any other data relating to behavior characteristic of gas permeating through the separation membrane, or a combination of these data.

The separation membrane may be structured so that a size in a direction in parallel to a flow direction of the supplied gas is configurationally or substantially shorter than a size in a direction perpendicular to the flow direction of the supplied gas. The language "configurationally shorter" is used to mean that the size is short due to the configuration of the separation membrane, such as the case where a length is shorter than a width in a flat membrane type separation membrane. In contrast, the language "substantially shorter" may be applied to the case that the size in a direction perpendicular to the flow direction can be assumed to be a size, such as a peripheral length in the case of a hollow yarn type separation membrane, which corresponds to a width in the case of a flat membrane type separation membrane. In the case that a plurality of separation membranes are provided in parallel, it is not necessary that each of the separation membranes is structured so that a size in a direction in parallel to the flow direction is shorter than a size in a direction perpendicular to the flow direction. Thus, it is only necessary that the parallel separation membranes satisfy the above relationship when a combination of the parallel separation membranes is taken as a single separation membrane.

By setting a size of the separation membrane in a direction in parallel to a flow direction of the supplied gas is configurationally or substantially shorter than a size in a direction perpendicular to the flow direction of the supplied gas, it is possible to avoid substantial decrease in the concentration of the permeated gas in a downstream region along the flow direction of supplied gas even in the case that the area of the separation membrane is increased in order to increase the processing capacity (the flow rate of the permeated gas per unit time) of the separation membrane. Therefore, the separation efficiency can be improved.

The separation membrane may include a plurality of separation membranes that are arranged in parallel from a most-upstream side in a flow path of the supplied gas. As noted above, it is only necessary that the parallel separation membranes satisfy the above relationship when a combination of the parallel separation membranes is taken as a single separation membrane.

By arranging the plurality of separation membranes such that a size (of a combination of the separation membranes) in a direction in parallel to the flow direction is substantially shorter than a size in a direction perpendicular to the flow direction, sizes of the separation membranes are not necessarily to be designed separately, and therefore, so that freedom of design is improved. Also, in the case where the concentration occurs stepwise by arranging a plurality of separation membranes in series with each other, some of the separation membranes positioned on a most-upstream side in the flow path of the supplied gas may be arranged in parallel, so that the processing capacity per unit time can be improved in a first separation (the separation capacity in this separation is most important).

Embodiments 1 to 4 of the present invention will be described below with reference to FIGS. 1 to 6. The invention is not limited to these embodiments but various modifications can be made without departing from the sprit of the present invention. A separation membrane module according to the present teachings is applicable to gas processing apparatus including those for separation of oxygen and nitrogen from air, separation and recovery of hydrogen from offgas in the Platforming process, separation and recovery of hydrogen in synthesis of ammonia, recovery of carbon dioxide and removal of nitrogen oxides and sulfur oxides from exhaust gases produced in steam power generation and garbage incineration, separation and recovery of carbon dioxide from offgas in oil fields, removal of sour gases such as hydrogen sulphide, carbon dioxide, etc. and separation and recovery of helium from natural gas having methane as a main component, dehumidification of an air for precision instrument and an ozone generator, dehydration from organic solvents, separation and recovery of fuel vapor from a fuel vapor containing gas generated from a gasoline fuel, and the other gas processing apparatus. As an example, an explanation will be given to the case of application to a fuel vapor processing apparatus for separation and recovery of fuel vapor from a fuel vapor containing gas.

Unlike a method of desorbing (purging) fuel vapor (vapor) adsorbed by a canister by using an intake pipe negative pressure during a driving operation of an engine, the fuel vapor processing apparatus of the present invention is configured as a purgeless evaporative system in which fuel vapor purged by a pump is pressure-fed to a separation membrane, separated by the separation membrane, and recovered at high concentration, and the apparatus can be mounted on a vehicle incorporating an idling stop system, a hybrid system, a direct injection engine, etc.

Embodiment 1

Figure 2:
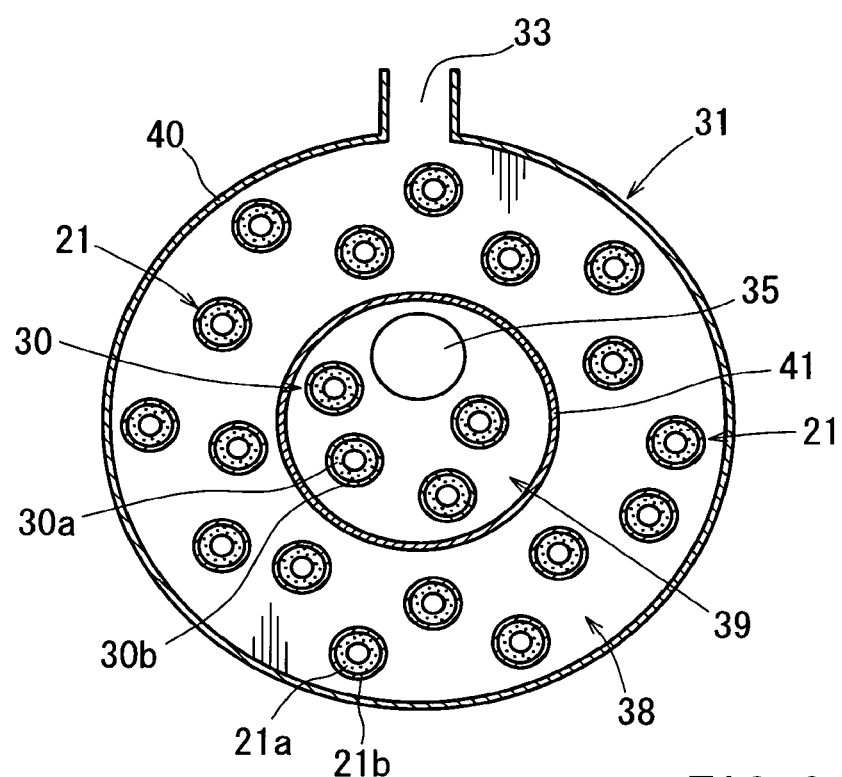
FIG. 2 is a cross sectional view taken along line II-II in FIG. 1.

FIG. 1 is a view showing a schematic configuration of a fuel vapor processing apparatus according to Embodiment 1 and FIG. 2 is a cross sectional view taken along line II-II in FIG. 1. As shown in FIG. 1, the fuel vapor processing apparatus of Embodiment 1 includes a canister 2 for adsorption and collection of a fuel vapor generating from a fuel tank 1, a separation membrane module provided with a separation membrane for separation of a fuel vapor containing gas containing fuel vapor desorbed from the canister 2, into a high concentration gas containing fuel vapor at high concentration and a low concentration gas containing the fuel vapor at low concentration, and a pump 3 that can pressure-feed a fuel vapor containing gas to the separation membrane module from the canister 2. As the separation membrane two kinds of separation membranes are used. One kind of separation membrane is a fuel vapor concentration membrane (hereinafter referred to as "concentration membrane") through which fuel vapor can pass in a high permeation coefficient, so that the concentration of fuel vapor on a permeation side of the concentration membrane is high (concentrated). The other kind of separation membrane is a fuel vapor dilution membrane (hereinafter referred to as "dilution membrane") through which fuel vapor can pass in a low permeation coefficient, so that the concentration of the fuel vapor on a non-permeation side of the dilution membrane is high. In this embodiment, the fuel vapor corresponds to a particular component of the present invention. In addition, the fuel vapor concentration membrane may be called as a particular component concentration membrane, the fuel vapor dilution membrane may be called as a particular component dilution membrane, and the pump 3 may be called as a pressure-feeding device. Also, the designations of "concentration membrane" and "dilution membrane" are taken the permeation side of the separation membrane as the criterion. Formed integrally within the canister 2 is a compartment wall 2a, which divides an inner space of the canister 2 into two sections.

Embodiment 1 is constructed so that first and second concentration membranes 20, 21 and a single dilution membrane 30 are arranged in series in order to separate a fuel vapor containing gas in three stages. A first separation membrane module 25 having the first concentration membrane 20 is positioned on a most-upstream side (toward the canister 2), and a second separation membrane module 31 having the second concentration membrane 21 and the dilution membrane 30 integrated together is provided on a downstream side of the first concentration membrane 20. The fuel tank 1 and the canister 2 are communicated to each other through an evaporative line 10. The canister 2 and a non-permeation chamber (low concentration gas chamber) 26 of the first separation membrane module 25 are communicated to each other through a purge line 11. The pump 3 is arranged in the purge line 11. A permeation chamber (concentrated gas chamber) 27 of the first separation membrane module 25 and the fuel tank 1 are communicated to each other through a recovery line 12. The non-permeation chamber 26 of the first separation membrane module 25 and an inlet port 32 of the second separation membrane module 31 are communicated in series to each other. First to third discharge ports 33, 34, 35 are provided on the second separation membrane module 31. Connected to the first and second discharge ports 33, 34 are first and second circulation lines 13, 14 extending to an upstream side of the pump 3 of the purge line 11. Connected to the third discharge port 35 is a return flow line 15 extending to the canister 2. Connected to the canister 2 is an atmospheric line 16. One end opposite to the side of the canister 2 of the atmospheric line 16 is communicated to the atmosphere. Also, a pressure regulating valve 4 is provided in the second circulation line 14 to maintain an interior of the system at a constant pressure.

An adsorptive material is provided within the canister 2 and has a porous body that can adsorb and collect fuel vapor generated in the fuel tank 1. Air having a smaller molecular size than that of a fuel component permeates through the porous body without being adsorbed. In Embodiment 1, activated carbon is used as the adsorptive material. Preferably provided within the canister 2 is a heater, which can heat an interior of the canister 2 and may be a heating element device, such as a piezoelectric element, etc. The pump 3 is electrically driven for desorbing fuel vapor adsorbed in the canister 2 and for pressure-feeding a fuel vapor containing gas, which contains the desorbed fuel vapor and an air, to the first separation membrane module 25. In addition, the pump 3 is controlled by an electronic control unit (ECU)(not shown). The ECU has a central processing unit (CPU), a read only memory (ROM), a random access memory (RAM), etc. A predetermined control program is beforehand stored in the ROM and the CPU operatively controls the pump 3, etc. in a predetermined timing on the basis of the control program. Also, preferably provided within the permeation chamber 27 of the first separation membrane module 25 communicated to the fuel tank 1 is a cooler that may be a cooling element device, such as a Peltier element, etc. that can cool and liquefy a concentrated gas permeating through the concentration membrane 20.

The concentration membranes 20, 21 are hydrocarbon separation membranes made of a material having a high permeation coefficient for a fuel component, and a low permeation coefficient for an air component or a component other than the fuel component. When a fuel vapor containing gas is fed to the concentration membranes 20, 21, a fuel component is permeated preferentially but an air component is hard to permeate. Thereby, a high concentration gas (concentrated gas) containing the fuel vapor at a higher concentration than the fuel vapor containing gas that was fed is refined and separated on the permeation sides of the concentration membranes 20, 21, and a low concentration gas containing the fuel vapor at a lower concentration than the fuel vapor containing gas that was fed is left and separated on the non-permeation sides. Each of the concentration membranes 20, 21 is constituted by a thin membrane formed of a non-porous polymer membrane having a high solution and diffusion coefficient for a fuel component to permit preferential permeation of a fuel component owing to solution, diffusion, and desolution, and a porous support medium, which supports the thin membrane. The concentration membrane may have a three-layered structure with a laminated non-woven fabric such as polyester, etc. in some cases. The thin membrane serves as a functional layer, which performs a primary separation function of each of the concentration membranes 20, 21. As the functional layer, a silicon-based polymer material is typically used. The silicon-based polymer material is high in selectivity and permeability for hydrocarbons as it is bridged to be insolubilized three dimensionally. The thin membrane may have a thickness of about 0.5 to 3 µm. On the other hand, a high solvent resistance is required for the porous support medium. For example, ceramic as well as synthetic resins such as polyimide (PI), polyetherimide (PEI), polyether sulphone (PES), or polyvinylidene fluoride (PVDF) can be used as the porous support medium. As each of the concentration membranes 20, 21, that having a configuration of a flat plate, a hollow yarn, a honeycomb, a spiral, etc. can be used. In Embodiment 1, the first concentration membrane 20 is a flat membrane with a functional layer laminated on one side of a flat-plate like support medium. On the other hand, the second concentration membrane 21 is a hollow yarn membrane with a functional layer 21b laminated on an outer surface of a porous, hollow-yarn like support medium 21a as shown in FIG. 2.

The dilution membrane 30 is an air (mainly, nitrogen) separation membrane using a material having a low permeation coefficient for a fuel component and a high permeation coefficient for an air component or a component other than the fuel component. When a fuel vapor containing gas is fed to the dilution membrane 30, an air component is permeated preferentially but a fuel component is hard permeate. Thereby, a low concentration gas (diluted gas) containing (containing the air component at a high concentration) a fuel vapor at a lower concentration than the fuel vapor containing gas that was fed is refined and separated on the permeation side of the dilution membrane 30, and a high concentration gas containing the fuel vapor at a higher concentration than the fuel vapor containing gas that was fed is left and separated on the non-permeation side. The dilution membrane 30 is constituted by a thin membrane formed of a non-porous polymer membrane, through which an air component is preferentially and selectively permeated, and a porous support medium, which supports the thin membrane. The dilution membrane 30 may have a three-layered structure with a laminated non-woven fabric such as polyester, etc. in some cases. The thin membrane serves as a functional layer, which performs a primary separation function of the dilution membrane 30. For the functional layer, it is possible to use a fluorine-based polymer material, which has selectivity and permeability for an air component. The porous support medium may be the same as that of the concentration membrane 20, or the like. Alternatively, a porous membrane, such as zeolite, etc., acting as a molecular sieve can be used for the dilution membrane 30. In the case of use of a porous membrane acting as a molecular sieve, a fuel vapor composed of a hydrocarbon having a large molecular size is hard to permeate through the porous membrane but an air component having a small molecular size can easily permeate through small pores of the porous membrane, so that air and fuel vapor are separated from each other. The dilution membrane 30 may have a configuration of a flat plate, a hollow yarn, a honeycomb, a spiral, etc. In Embodiment 1, a hollow yarn membrane with a functional layer 30b laminated on an outer surface of a porous, hollow-yarn like support medium 30a is used as shown in FIG. 2.

Subsequently, a detailed explanation will be given to the second separation membrane module 31, in which the concentration membrane 21 and the dilution membrane 30 are integrated. As shown in FIGS. 1 and 2, the separation membrane module 31 has a fuel vapor concentration chamber 38 and a fuel vapor dilution chamber 39 provided in series within a hollow case having no gas permeability. The hollow case is of an internal and external, dual structure having a cylindrical-shaped outer case 40 and a cylindrical-shaped inner case 41 positioned substantially radially centrally of the outer case 40 and having a smaller diameter than that of the outer case 40. The concentration chamber 38 with a plurality of concentration membranes 21 is defined within the outer case 40 (outside of the inner case 41) and the dilution chamber 39 with a plurality of dilution membranes 30 is defined within the inner case 41. Both ends of each of the concentration membranes 21 and the dilution membranes 30 respectively formed of the hollow yarn membranes are extended proximal to left and right walls of the outer case 40 and the inner case 41. However, only one concentration membrane 21 and only one dilution membrane 30 may be provided although a separation capacity (flow rate of permeating gas) per unit time may be lowered. From a viewpoint of increasing separation efficiency, as many concentration membranes 21 and many dilution membranes 30 as possible are preferably provided to substantially fill up internal spaces of the outer case 40 and the inner case 41. A peripheral wall of the inner case 41 forms a compartment wall, which divides between the concentration chamber 38 and the dilution chamber 39, and the compartment wall is parallel to the concentration membranes 21 and the dilution membranes 30.

One end side of each of the concentration membranes 21 is extended through and supported by a partition plate 42 and the other end side of each of the concentration membranes 21 is extended through and supported by a partition plate 43. One end side of each of the dilution membranes 30 is extended through and supported by a partition plate 44 and the other end side of each of the dilution membranes 30 is extended through and supported by the partition plate 43. The partition plates 42 to 44 have no gas permeability and delimit left and right sides of the concentration chamber 38 and the dilution chamber 39. The separation membrane module 31 is a so-called internal pressure permeation type module and gases can flow between inside and outside of each of the partition plates 42 to 44 only through internal spaces of the concentration membranes 21 and the dilution membranes 30. An intake chamber 45 of the separation membrane module 31 is defined outside of the partition plate 42, through which the one end side of each of the concentration membranes 21 extends. A communication chamber 46 connecting the concentration chamber 38 and the dilution chamber 39 in series to each other is defined outside of the partition plate 43, through which the other end side of each of the concentration membranes 21 and the dilution membranes 30 extends. The concentration chamber 38 and the dilution chamber 39 can also be said to serve as a permeation chamber of the separation membrane module 31. A non-permeation chamber 47 of the separation membrane module 31 is defined outside of the partition plate 44, through which the one end side of each of the dilution membranes 30 extends. The inlet port 32 of the separation membrane module 31 is provided on one end wall of the outer case 40 in a manner to communicate with the intake chamber 45. The first discharge port 33 of the separation membrane module 31 is provided on a peripheral wall of the outer case 40 in a manner to communicate with the concentration chamber 38. The second discharge port 34 of the separation membrane module 31 is provided on one end wall of the inner case 41 in a manner to communicate with the non-permeation chamber 47. The third discharge port 35 of the separation membrane module 31 is provided in a manner to communicate with the dilution chamber 39. The return flow line 15 extends through the other end wall of the outer case 40 and the partition plate 43 and into an interior of the inner case 41. With this construction, for the concentration chamber 38 and the dilution chamber 39, only a concentrated gas permeated through the concentration membranes 21 in the concentration chamber 38 on an upstream side can flow into the dilution chamber 39. The number of the discharge ports corresponds to the number of kinds of gases that are separated and refined, so that gases separated in the concentration chamber 38 and the dilution chamber 39 can be exhausted separately.

Subsequently, an explanation will be given to the operation of the fuel vapor processing apparatus. When fuel vapor is generated within the fuel tank 1, the fuel vapor flows through the evaporative line 10 so as to be adsorbed and collected in the canister 2 and the remaining air component flows through the canister 2 and is discharged from the atmospheric line 16. When a switch, such as an ignition switch (IG switch), a starter, etc., for starting an internal combustion engine is turned ON, the pump 3 is driven, so that a flow of air from the canister 2 into the first separation membrane module 25 is produced. Then, air (outside air) is introduced from the atmospheric line 16, so that the fuel vapor adsorbed in the canister 2 is desorbed (purged). The fuel vapor purged from the canister 2 together with an air component introduced from the purge line 11 is pressure-fed as a fuel vapor containing gas to the non-permeation chamber 26 of the first separation membrane module 25 through the purge line 11 by the pump 3. Then, a fuel component is preferentially separated from the fuel vapor containing gas by permeation through the first concentration membrane 20 and a concentrated gas containing the fuel vapor at a high concentration is refined in the permeation chamber 27. The concentrated gas is recovered into the fuel tank 1 through the recovery line 12.

On the other hand, a medium concentration gas $G_1$ is left in the non-permeation chamber 26 of the first separation membrane module 25. The medium concentration gas $G_1$ is a mixture of air that was not separated by the first concentration membrane 20 and fuel vapor that was left because it could not be separated by the first concentration membrane 20. The medium concentration gas $G_1$ is fed into the second separation membrane module 31 by the pump 3. The second separation membrane module 31 is of an internal pressure separation type, so that the medium concentration gas $G_1$ fed into the intake chamber 45 from the inlet port 32 flows into the inner spaces of the respective concentration membranes 21. Then a fuel component $P_1$ is preferentially separated from the medium concentration gas $G_1$ by permeation through the second concentration membranes 21. A secondary concentrated gas $G_2$ containing the fuel vapor of higher concentration than that in the medium concentration gas $G_1$ is refined in the concentration chamber 38. The secondary concentrated gas $G_2$ is refluxed upstream of the pump 3 through the first circulation line 13 from the first discharge port 33 to be again fed to the first separation membrane module 25.

A low concentration gas $G_3$ may be left in the inner spaces of the respective second concentration membranes 21 and flows to the communication chamber 46 as it is. The low concentration gas $G_3$ is a mixture of air that was not separated by the concentration membranes 21 and a small amount of fuel vapor that was not separated by the concentration membranes 21. After reaching the communication chamber 46, the low concentration gas $G_3$ flows into the inner spaces of the respective dilution membranes 30 arranged within the inner case 41. Then, an air component $P_2$ is preferentially separated from the low concentration gas $G_3$ by permeation through the dilution membranes 30, so that a diluted gas (air concentrated gas) $G_4$ containing a fuel vapor component in a concentration less than that in the low concentration gas $G_3$ is refined in the dilution chamber 39. The diluted gas $G_4$ is returned to the canister 2 through the return flow line 15 from the third discharge port 35. Since the diluted gas $G_4$ is a gas separated by permeation through the dilution membranes 30, the concentration of the fuel vapor contained in the diluted gas $G_4$ is surely lowered. Accordingly, even in the case that the diluted gas $G_4$ is returned to the canister 2 and used as a purge gas, it is possible to avoid decrease in efficiency of desorbing a fuel vapor from the canister 2. A tertiary concentrated gas $G_5$ containing the fuel vapor that was not permeated through the dilution membranes 30 is left in the inner spaces of the dilution membranes 30 and flows to the non-permeation chamber 47 of the second separation membrane module 31 as it is. The tertiary concentrated gas $G_5$ is refluxed upstream of the pump 3 through the circulation line 14 from the second discharge port 34. The tertiary concentrated gas $G_5$ refluxed upstream of the pump 3 is thereafter processed in the same manner as the secondary concentrated gas $G_2$.

Embodiment 2

Figure 3:
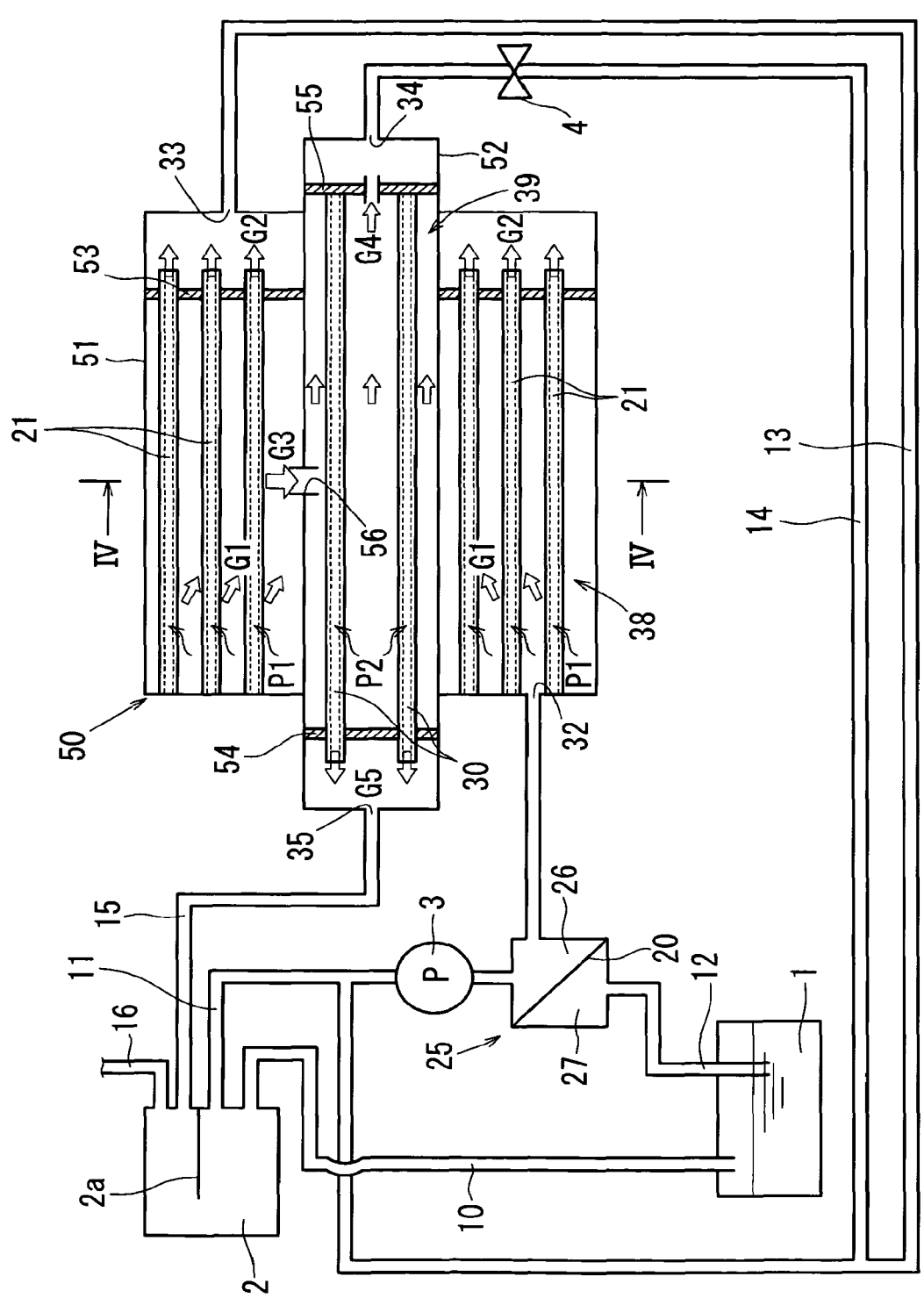
FIG. 3 is a view showing a schematic configuration of a fuel vapor processing apparatus according to Embodiment 2.
Figure 4:
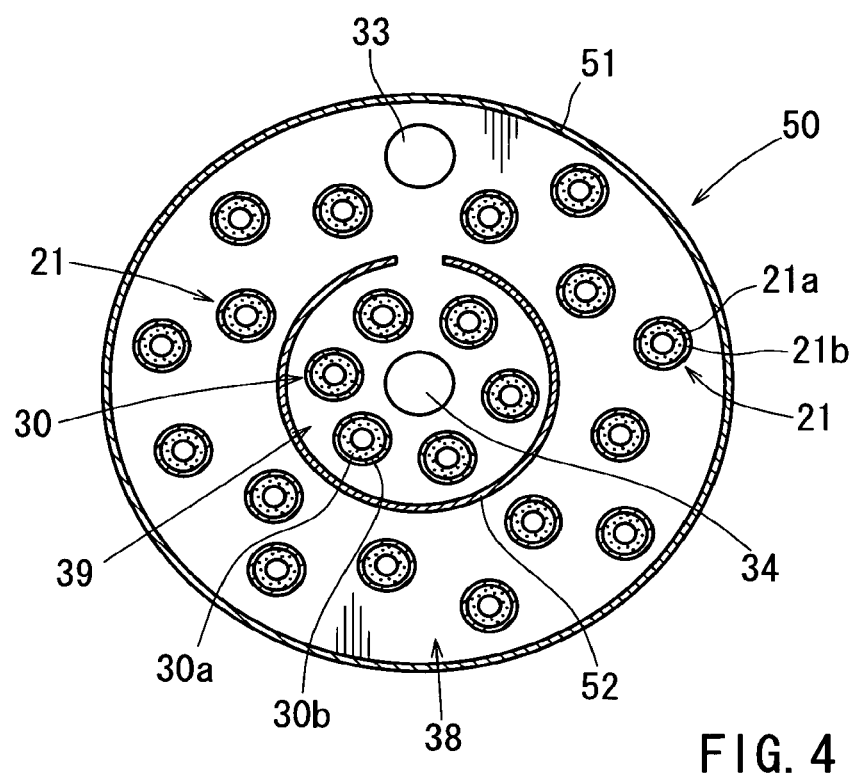
FIG. 4 is a cross sectional view taken along line IV-IV in FIG. 3.

FIG. 3 is a view showing a schematic configuration of a fuel vapor processing apparatus according to Embodiment 2 and FIG. 4 is a cross sectional view taken along the line IV-W in FIG. 3. While the separation membrane module 31 having a plurality of separation membranes integrated therein is configured as an internal pressure separation type module in Embodiment 1, the separation membrane module having a plurality of separation membranes integrated therein can be configured as an external pressure separation type module. That is, Embodiment 2 is a modification of Embodiment 1 and different from the latter in the construction of the second separation membrane module. Accordingly, an explanation will be focused on the construction of the second separation membrane module, which is different from that of Embodiment 1. In FIGS. 3 and 4, like members are given the same reference numerals as Embodiment 1 and an explanation of these members will be omitted.

As shown in FIGS. 3 and 4, a hollow case of a separation membrane module 50 is of an internal and external, dual structure having a cylindrical-shaped outer case 51 and a cylindrical-shaped inner case 52 arranged substantially radially centrally of the outer case 51 and having a smaller diameter than that of the outer case 51. A concentration chamber 38 with a plurality of concentration membranes 21 is defined in the outer case 51 (outside of the inner case 52) and a dilution chamber 39 with a plurality of dilution membranes 30 is defined in the inner case 52. In addition, in contrast to Embodiment 1, a low concentration gas can be refined in the concentration chamber 38 and a concentrated gas can be refined in the dilution chamber 39. Both ends of each of the concentration membranes 21 and the dilution membranes 30 respectively formed of hollow yarn membranes are extended proximal to left and right walls of the outer case 51 and the inner case 52. A peripheral wall of the inner case 52 forms a compartment wall, which divides between the concentration chamber 38 and the dilution chamber 39, and the compartment is parallel to the concentration membranes 21 and the dilution membranes 30. One end side of each of the concentration membranes 21 is joined to one end wall of the outer case 51 and the other end side of each of the concentration membranes 21 is extended through and supported by a partition plate 53. One end side of each of the dilution membranes 30 is extended through and supported by a partition plate 54 and the other end side of each of the dilution membranes 30 is extended through and supported by a partition plate 55. The partition plates 53 to 55 have no gas permeability and delimit left and right sides of the concentration chamber 38 and the dilution chamber 39. Gases can flow between inside and outside the partition plates 53 to 55 only through inner spaces of the concentration membranes 21 and the dilution membranes 30. A communication hole 56 for connection in series between the concentration chamber 38 and the dilution chamber 39 is formed through the peripheral wall of the inner case 52. The concentration chamber 38 and the dilution chamber 39 serve as a non-permeation chamber of the separation membrane module 31. Permeation chambers are defined outside of the partition plate 53, which supports the other end side of each of the concentration membranes 21, and outside of the partition plates 54, 55. An inlet port 32 of the separation membrane module 50 is provided on one end wall of the outer case 51 in a manner to communicate with the concentration chamber 38. A first discharge port 33 of the separation membrane module 50 is provided on the other end wall of the outer case 40 in a manner to communicate with the other end of each of the concentration membranes 21. A second discharge port 34 of the separation membrane module 50 is provided on the other end wall of the inner case 52 in a manner to communicate with the dilution chamber 39. A third discharge port 35 of the separation membrane module 50 is provided on one end wall of the inner case 52 in a manner to communicate with one end or each of the dilution membranes 30. With this construction, for the concentration chamber 38 and the dilution chamber 39, only a concentrated gas that has not permeated through the concentration membranes 21 in the concentration chamber 38 on an upstream side can flow to the dilution chamber 39. The number of the discharge ports corresponds to the number of kinds of gases that are separated and refined, so that gases separated in the concentration chamber 38 and the dilution chamber 39 can be exhausted separately.

Subsequently, an explanation will be given to the operation of the fuel vapor processing apparatus. By the same operation as explained in connection with Embodiment 1, a medium concentration gas $G_1$ left in the non-permeation chamber 26 of the first separation membrane module 25 is fed into the concentration chamber 38 of the separation membrane module 50 from the inlet port 32. Then a fuel component $P_1$ is preferentially separated from the medium concentration gas $G_1$ by permeating through the second concentration membranes 21, and a secondary concentrated gas $G_2$ containing fuel vapor in higher concentration than the medium concentration gas $G_1$ is refined in the spaces of the concentration membranes 21. The secondary concentrated gas $G_2$ flows to the other end of each of the concentration membranes 21 to be refluxed upstream of the pump 3 through the first circulation line 13 from the first discharge port 33 and is again fed to the first separation membrane module 25. A low concentration gas $G_3$ is a mixture of air that was not separated by the concentration membranes 21 and a small amount of fuel vapor that was not separated by the concentration membranes 21. The low concentration gas $G_3$ is left in the concentration chamber 38 and flows to the dilution chamber 39 of the inner case 52 through the communication hole 56. Then, an air component $P_2$ is preferentially separated from the low concentration gas $G_3$ by permeating through the dilution membranes 30. A diluted gas (air concentrated gas) $G_5$ containing a fuel vapor component in a concentration less than that of the low concentration gas $G_3$ is refined in the spaces of the dilution membranes 30. The diluted gas $G_5$ flows to one end of each of the dilution membranes 30 and is returned to the canister 2 through the return flow line 15 from the third discharge port 35. A tertiary concentrated gas $G_4$ containing the fuel vapor that was not permeated through the dilution membranes 30 is left in the dilution chamber 39. The tertiary concentrated gas $G_4$ flows through the partition plate 55 to be refluxed upstream of the pump 3 through the circulation line 14 from the second discharge port 34. Since the other construction and operation is the same as that of Embodiment 1.

Embodiment 3

Figure 5:
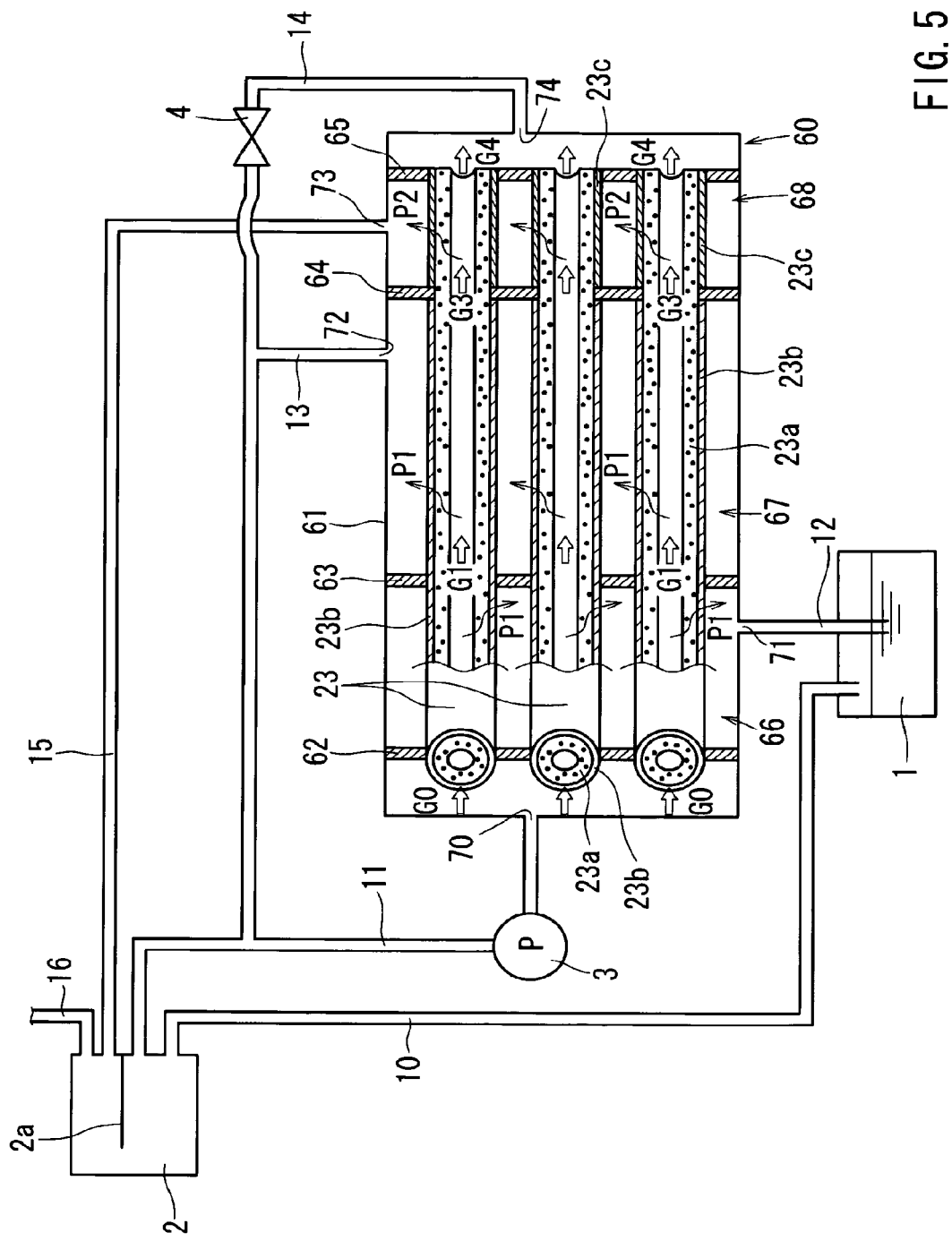
FIG. 5 is a view showing a schematic configuration of a fuel vapor processing apparatus according to Embodiment 3.

FIG. 5 is a view showing a schematic configuration of a fuel vapor processing apparatus according to Embodiment 3. Embodiment 3 is different from Embodiment 1 and Embodiment 2 in the construction of a separation membrane module. That is, a separation membrane module 60 in Embodiment 3 has only one hollow case 61 and one hollow yarn membrane 23 has both of a concentration function and a dilution function. In addition, Embodiment 3 has a construction, in which the first separation membrane module 25 provided in Embodiment 1 and Embodiment 2 is not incorporated and a fuel vapor containing gas $G_0$ is fed from the canister 2 directly to a separation membrane module 60. In FIG. 5, like members are given the same reference numerals as Embodiment 1 and Embodiment 2 and an explanation of these members will be omitted.

As shown in FIG. 5, the separation membrane module 60 has a plurality of hollow yarn membranes 23 arranged in a hollow case 61 having no gas permeability. The hollow yarn membranes 23 are arranged to extend proximal to both left and right ends of the hollow case 61. Each of the hollow yarn membranes 23 is supported in a state of being inserted through partition plates 62 to 65 having no gas permeability. Thereby, an interior of the hollow case 61 is divided into a plurality of chambers along a length direction of the hollow yarn membranes 23 by the partition plates 62 to 65. These chambers communicate one another through the spaces of the hollow yarn membranes 23. The partition plates 62 to 65 may be called as compartment walls, and the compartment plates 62 to 65 are provided in a manner to intersect the hollow yarn membranes 23. Each of the hollow yarn membranes 23 has a concentration functional layer 23*b* and a dilution functional layer 23*c* that are laminated on an outer surface of a hollow yarn like porous support medium 23*a* in a state of being separated along a longitudinal direction by the partition plate 64. The concentration functional layer 23*b* serves to increase the concentration of fuel vapor by allowing the fuel vapor to permeate therethrough. The dilution functional layer 23*c* serves to increase the concentration of fuel vapor by preventing the fuel vapor from permeating therethrough. Therefore, as viewed from an upstream side (toward an inlet port 70), a primary concentration chamber 66 is defined between the partition plate 62 and the partition plate 63, a secondary concentration chamber 67 is defined between the partition plate 63 and the partition plate 64, and a dilution chamber 68 is defined between the partition plate 64 and the partition plate 65.

The inlet port 70 is provided on one end wall of the hollow case 61 to communicate with starting ends of the hollow yarn membranes 23. A first discharge port 71 is provided on a peripheral wall of the hollow case 61 to communicate with the first concentration chamber 66. In addition, since the first separation membrane module 25 of Embodiment 1 and Embodiment 2 is not incorporated into Embodiment 3, the purge line 11 is connected to an inlet port of the separation membrane module 60 and the recovery line 12 is connected to the first discharge port 71. A second discharge port 72 is provided on the peripheral wall of the hollow case 61 to communicate with the secondary concentration chamber 67, and the first circulation line 13 is connected to the second discharge port 72. A third discharge port 73 is provided on the peripheral wall of the hollow case 61 to communicate with the dilution chamber 68, and the second circulation line 14 is connected to the third discharge port 73. A fourth discharge port 74 is provided on the other end wall of the hollow case 61 to communicate with terminal ends of the hollow yarn membranes 23 and the return flow line 15 is connected to the fourth discharge port 74.

Subsequently, an explanation will be given to the operation of the fuel vapor processing apparatus. A fuel vapor containing gas $G_0$ containing fuel vapor desorbed from the canister 2 by the pump 3 is fed directly to the separation membrane module 60. The separation membrane module 60 of Embodiment 3 is of an internal pressure separation type, and therefore, the fuel vapor containing gas $G_0$ fed from the inlet port 70 flows into the spaces of the hollow yarn membranes 23. Then, a fuel component $P_1$ is preferentially separated from the fuel vapor containing gas $G_0$ by permeating through the concentration functional layers 23b of the hollow yarn membranes 23 in the first concentration chamber 66 positioned on a most-upstream side in the separation membrane module 60, so that a primary concentrated gas containing fuel vapor in a concentration higher than that of the fuel vapor containing gas $G_0$ is refined in the first concentration chamber 66. The primary concentrated gas is recovered into the fuel tank 1 through the recovery line 12 from the first discharge port 71. On the other hand, a medium concentration gas $G_1$ is left in the spaces of the hollow yarn membranes 23 and passes through the spaces of the hollow yarn membranes 23 to flow toward the secondary concentration chamber 67 as it is. The medium concentration gas $G_1$ is a mixture of air that was not separated by the concentration functional layers 23b of the hollow yarn membranes 23 and fuel vapor that was left without being separated by the concentration functional layers 23b. Then, a fuel component $P_1$ is preferentially separated from the medium concentration gas $G_1$ by permeating through the concentration functional layers 23b of the hollow yarn membranes 23 in the secondary concentration chamber 67 in the same manner as in the first concentration chamber 66, and therefore, a secondary concentrated gas containing fuel vapor in a concentration higher than that in the medium concentration gas $G_1$ is refined in the secondary concentration chamber 67. The secondary concentrated gas is refluxed upstream of the pump 3 through the circulation line 13 from the second discharge port 72. On the other hand, a low concentration gas $G_3$ is left in the spaces of the hollow yarn membranes 23 and flows toward the dilution chamber 68 through the spaces of the hollow yarn membranes 23 as it is. The low concentration gas $G_3$ is a mixture of air that was not separated by the concentration functional layers 23b of the hollow yarn membranes 23 and a small amount of fuel vapor that was left without being separated by the concentration functional layers 23b. Then, an air component $P_2$ is preferentially separated from the low concentration gas $G_3$ by permeating through the dilution functional layers 23c of the hollow yarn membranes 23 in the dilution chamber 68. Therefore, a diluted gas (increased in air concentration) containing fuel vapor in a concentration lower than that in the low concentration gas $G_3$ is refined in the dilution chamber 68. The diluted gas is returned to the canister 2 from the third discharge port 73. On the other hand, a tertiary concentrated gas $G_4$ is left in the spaces of the hollow yarn membranes 23. The tertiary concentrated gas $G_4$ contains fuel vapor that was not separated by the dilution functional layers 23c of the hollow yarn membranes 23. The tertiary concentrated gas $G_4$ flows to the other ends of the hollow yarn membranes 23, passes through the second circulation line 14 from the fourth discharge port 74, and returns upstream of the pump 3. Here, the separation efficiency (i.e., the concentration of a particular component in permeated gases) by a gas separation membrane tends to become higher as the concentration of a particular component in gases that are fed becomes higher. Accordingly, in Embodiment 3, the concentration of fuel vapor of the primary concentrated gas separated and refined in the first concentration chamber 66 is higher than the concentration of fuel vapor of the secondary concentrated gas separated and refined in the secondary concentration chamber 67.

Embodiment 4

Figure 6:
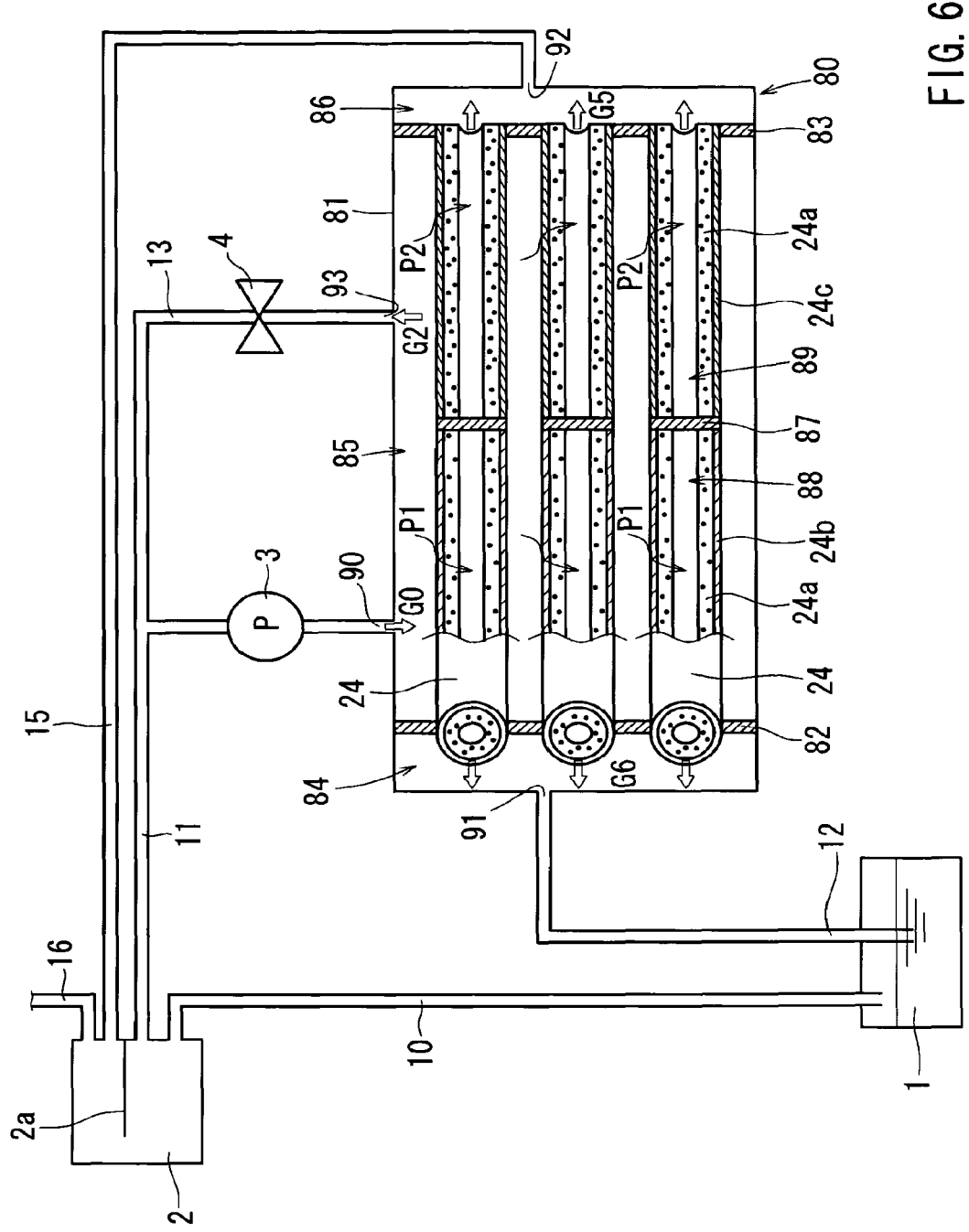
FIG. 6 is a view showing a schematic configuration of a fuel vapor processing apparatus according to Embodiment 4.

FIG. 6 is a view showing a schematic configuration of a fuel vapor processing apparatus according to Embodiment 4. Embodiment 4 is a modification of Embodiment 3 and of an external pressure separation type in contrast to Embodiment 3 of an internal pressure separation type. In FIG. 6, like members are given the same reference numerals as Embodiment 3 and an explanation of these members will be omitted.

Specifically, as shown in FIG. 6, a separation membrane module 80 has a plurality of hollow yarn membranes 24 arranged in a hollow case 81 having no gas permeability. The hollow yarn membranes 24 are arranged to extend proximal to left and right ends of the hollow case 81. Both left and right end sides of each of the hollow yarn membranes 24 are supported in a state of being inserted through partition plates 82, 83 having no gas permeability. Thereby, an interior of the hollow case 81 is divided into a first permeation chamber 84 disposed outside (on the left in FIG. 6) of the partition plate 82, a non-permeation chamber 85 disposed between the partition plate 82 and the partition plate 83, and a second permeation chamber 86 disposed outside (on the right in FIG. 6) of the partition plate 83. The non-permeation chamber 85 and the first and second permeation chambers 84, 86 are communicated to one another only through spaces of the hollow yarn membranes 24. Further, a partition plate 87 is provided in the space of each of the hollow yarn membranes 24. Each of the hollow yarn membranes 23 has a concentration functional layer 24b and a dilution functional layer 24c that are laminated on an outer surface of a hollow yarn like porous support medium 24a in a state of being separated along a longitudinal direction by the partition plate 87. The concentration functional layer 24b serves to increase the concentration of fuel vapor by allowing the fuel vapor to permeate therethrough. The dilution functional layer 24c serves to increase the concentration of fuel vapor by preventing the fuel vapor from permeating therethrough. Thereby, the space of each of the hollow yarn membranes 24 is divided into left and right sections by the partition plate 87, a concentration chamber 88 is defined on one side (on the left in the FIG. 6), on which the concentration functional layer 24b is laminated, and a dilution chamber 89 is defined on the other side (on the right in FIG. 6), on which the dilution functional layer 24c is laminated. The partition plates 82, 83, 87 may be called as compartment walls and are provided in a manner to intersect the hollow yarn membranes 24.

An inlet port 90 is provided on a peripheral wall of the hollow case 81 in a manner to communicate with the non-permeation chamber 85. A first discharge port 91 is provided on one end wall of the hollow case 81 to communicate with the first permeation chamber 84. In addition, since the first separation membrane module 25 of Embodiment 1 and Embodiment 2 is not incorporated into Embodiment 4, the purge line 11 is connected to the inlet port 90 of the separation membrane module 80 and the recovery line 12 is connected to the first discharge port 91. A second discharge port 92 is provided on the other end wall of the hollow case 81 to communicate with the second permeation chamber 86, and the return flow line 15 is connected to the second discharge port 92. A third discharge port 93 is provided on a peripheral wall of the hollow case 81 to communicate with the non-permeation chamber 85, and the circulation line 13 is connected to the third discharge port 93. In addition, the inlet port 90 is provided on the side of the concentration functional layers 24b laminated on the hollow yarn membranes 24, and the third discharge port 93 is provided on the side of the dilution functional layers 24c laminated on the hollow yarn membranes 24. Although the inlet port 90 and the third discharge port 93 can be provided in a positional relationship opposite to that described above, they are preferably provided in the positional relationship as in Embodiment 4. This is because the functional layers have such characteristics that the separation efficiency (concentration of permeated gases) becomes higher as the concentration of a particular component, which is an object to be permeated and separated, becomes higher.

Subsequently, an explanation will be given to the operation of the fuel vapor processing apparatus. A fuel vapor containing gas $G_0$ containing fuel vapor desorbed from the canister 2 by the pump 3 is fed directly to the separation membrane module 80. The separation membrane module 80 in Embodiment 4 is of an external pressure separation type, and therefore, when the fuel vapor containing gas $G_0$ is fed to the non-permeation chamber 85 from the inlet port 90, particular components contained in the fuel vapor containing gas $G_0$ flow preferentially into the spaces through the functional layers 24b, 24c, respectively, from outside of the respective hollow yarn membranes 24. When the fuel vapor containing gas $G_0$ is fed from the inlet port 90, a fuel component $P_1$ is first separated from the fuel vapor containing gas $G_0$ in the non-permeation chamber 85 by permeating through the concentration functional layers 24b of the respective hollow yarn membranes 24, so that a primary concentrated gas $G_6$ containing fuel vapor in the concentration higher that in the fuel vapor containing gas $G_0$ is refined in the concentration chambers 88 in the spaces of the hollow yarn membranes 24. The primary concentrated gas $G_6$ flows into the first permeation chamber 84 through the spaces of the hollow yarn membranes 24 as it is, and is recovered into the fuel tank 1 through the recovery line 12 from the first discharge port 91. At this time, a medium concentration gas is left in the non-permeation chamber 85. The medium concentration gas is a mixture of air that was not separated by the concentration functional layers 24b of the hollow yarn membranes 24 and fuel vapor that was left without being separated by the concentration functional layers 24b. The medium concentration gas flows toward the third discharge port 93 in the non-permeation chamber 85, then an air component $P_2$ is preferentially separated from the medium concentration gas by permeating through the dilution functional layers 24c of the hollow yarn membranes 24, and a diluted gas $G_5$ (increased in air concentration) containing fuel vapor in the concentration lower than that in the medium concentration gas is refined in the dilution chamber 89. The diluted gas $G_5$ flows to the second permeation chamber 86 through spaces of the hollow yarn membranes 24 as it is, and is recovered into the fuel tank 1 through the return flow line 15 from the second discharge port 92. A secondary concentrated gas $G_2$ containing a fuel component that was not permeated through the dilution functional layers 24c is left in the non-permeation chamber 85, and the secondary concentrated gas $G_2$ is refluxed upstream of the pump 3 through the circulation line 13 from the third discharge port 93.

(Other Possible Modifications of Embodiments 1 to 4)

Embodiment 1 and Embodiment 2 can be modified such that the concentration membranes 21 are provided inside and the dilution membranes 30 are provided outside. Although Embodiment 1 and Embodiment 2 are of an internal and external, dual structure in a radial direction, they are not limited thereto but can be of a structure, in which spaces are stacked in three or more, internal and external layers. In this case, one or more of a plurality of spaces stacked inside and outside in a radial direction may be constituted as a concentration chamber(s) 38 and one or more of the remaining spaces may be constituted as a dilution chamber(s) 39. Also, a case having a large internal diameter and a case having a small internal diameter to be used for a hollow case are not limited to have a cylindrical shape but can assume various shapes such as a shape having a polygonal (triangular, rectangular, etc.) cross sectional configuration, an elliptical cross sectional configuration, or any other cross sectional configuration as far as allowing insertion and outsertion. An outer case and an inner case are not necessarily required to be the same in shape. A cylindrical shape is preferable since it allows gases to flow smoothly and it is possible to avoid gases from staying partially.

Also, with respect to configurations as in Embodiment 1 and Embodiment 2, it is not necessary to use a plurality of cases that are positioned on the outer side or the inner side of each other. For example, a compartment wall dividing a hollow case into a concentration chamber and a dilution chamber can be provided in parallel to a separation membrane. Thus, an interior of a hollow case can be divided into a plurality of chambers by one or more compartment walls formed integrally with the hollow case. In this case, it is possible to arrange the chambers to be aligned vertically, and a communication chamber(s) for communication between the two adjacent chambers can be provided. That is, the construction similar to the canister 2 used in Embodiment 1 and Embodiment 2 can be incorporated.

In the cases of Embodiment 3 and Embodiment 4, the number of times of concentration (the number of times of separation) can be set by changing the number of partition plates serving as compartment walls. In this case, a concentration functional layer and a dilution functional layer may be provided in a state, in which a dilution functional layer is provided between concentration functional layers, or a plurality of concentration functional layers and dilution functional layers are alternately arranged, instead of simply divided into two layers. The hollow case of Embodiment 3 and Embodiment 4 is not limited to a cylindrical shape.

In any of these modifications, discharge ports are provided in appropriate locations and in the number corresponding to kinds of gases that are separated and refined, so that gases separated and refined in the concentration chamber and the dilution chamber are discharged separately. In such a case, a circulation line and a return flow line may be appropriately connected to the respective discharge ports according to kinds of gases (i.e., the number of the gases containing fuel vapor in different concentrations) be separated. Also, Embodiment 1 and Embodiment 2 may be modified to eliminate the first separation membrane module 25, so that a fuel vapor containing gas from the canister 2 is fed directly to a separation membrane module, in which a plurality of separation membranes are integrated into a single module. On the contrary, Embodiment 3 and Embodiment 4 can be modified such that a medium concentration gas separated by a first separation membrane is fed as in Embodiment 1 and Embodiment 2.

The separation membrane module according to the present teachings is usable also in the case where a particular component other than fuel vapor is separated and recovered from various mixed gases described above, other than the case where fuel vapor is separated and recovered from a fuel vapor containing gas. In this case, it is only necessary that a material of a functional layer be appropriately chosen to be high in permeation coefficient for a particular component, like a functional layer material described in JP-A-63-315104, JP-A-9-66224 and JP-A-2008-173573.

In the above Embodiments, the pump 3 is arranged in the purge line 11 upstream of the separation membrane modules in order to pressure-feed a fuel vapor containing gas to the separation membrane from the canister 2. However, the pump 3 can be arranged, for example, in the return flow line 15, so that a fuel vapor containing gas is fed under reduced pressure to the separation membrane from the canister 2 by the pump 3 provided downstream of the separation membrane modules.

Although the switch, such as an ignition switch (IG switch), a starter, etc., for starting the internal combustion engine is turned ON to drive the pump for operating the fuel vapor processing apparatus, the fuel vapor processing apparatus may be operated during stoppage of the internal combustion engine, or when the IG switch is turned OFF.

Subsequently, Embodiments 5 to 12 of the invention will be described with reference to FIGS. 7 to 24. Although these Embodiments relates to fuel vapor processing apparatus for internal combustion engines, which can efficiently recover fuel vapor, which is generated in a fuel tank, into the fuel tank after concentration through a separation membrane for selective permeation and separation of a fuel component, the features of these Embodiments can be incorporated in combination with the features of Embodiments 1 to 6 as will be explained later.

Figure 25:
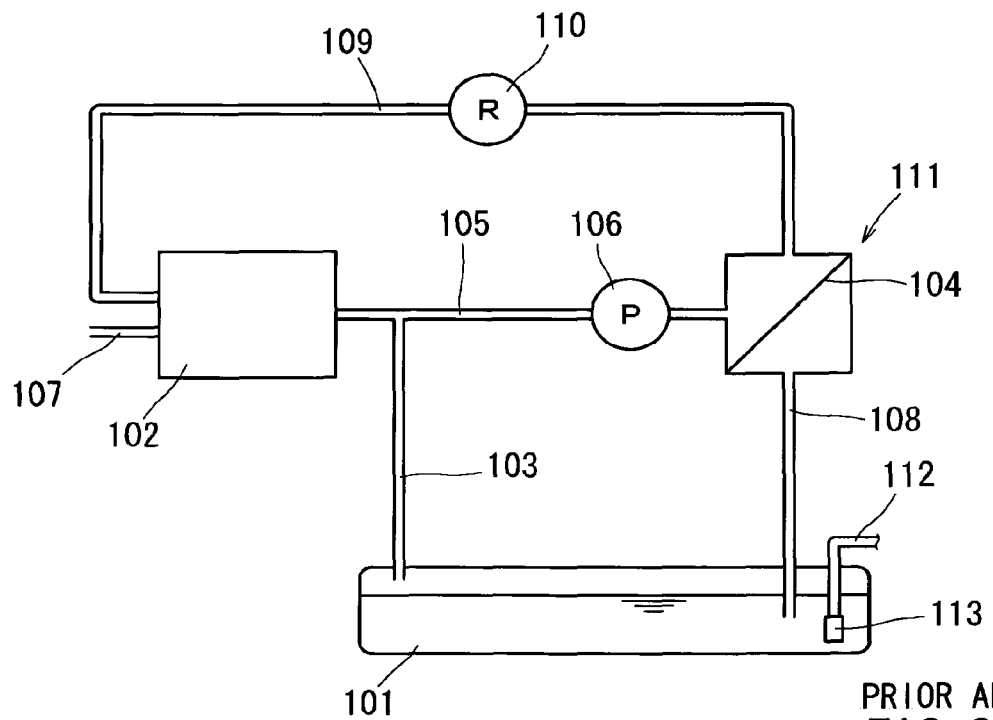
FIG. 25 is a view showing a schematic configuration of a known fuel vapor processing apparatus.
Figure 26:
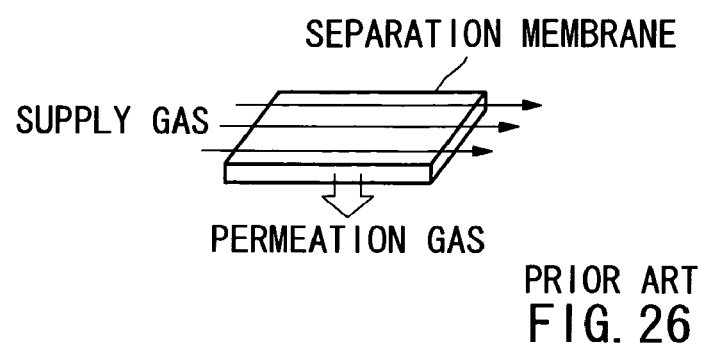
FIG. 26 is a conceptual view illustrating the principle of separation by a known separation membrane.

First, prior to describing the Embodiments, the technological background of the Embodiments 5 to 13 will be described with reference to FIGS. 25 and 26. Described in terms of a simplest, fundamental construction, a fuel vapor processing apparatus according to the background technology includes, as shown in FIG. 25, a canister 102 for adsorption and collection of fuel vapor generated in a fuel tank 101, a separation membrane module 111 including a separation membrane 104 for selective permeation and separation of a fuel component from a gas containing the fuel vapor desorbed from the canister 102, and a pump 106 for pressure-feeding the fuel vapor containing gas to the separation membrane module 111 from the canister 102. An adsorptive material made of a porous body such as activated carbon, etc. is charged within the canister 102. The reference numeral 103 denotes an evaporative passage for communication between the fuel tank 101 and the canister 102, 105 denotes a purge passage for communication between the canister 102 and the separation membrane module 111, 107 denotes an atmospheric passage for communication between the canister 102 and the atmosphere, 108 denotes a recovery passage for communication between the separation membrane module 111 and the fuel tank 101, 109 denotes a return flow passage for communication between the separation membrane module 111 and the canister 102, and 110 denotes a pressure regulator, by which an interior of a system is maintained constant in pressure. In addition, a fuel pump 113 is arranged in the fuel tank 101 for pressure-feeding fuel to an engine (not shown) through a fuel feed passage 112.

This fuel vapor processing apparatus is constructed as an evaporative purgeless system, in which unlike a method of desorption (purging) by using an intake pipe negative pressure at the time of driving of an engine, fuel vapor adsorbed and collected into the canister 102 is pressure-fed to the separation membrane module 111 and can be purged by the pump 106. The fuel vapor permeating through the separation membrane 104 is recovered at a high concentration. Specifically, fuel vapor generated in the fuel tank 101 flows through the evaporative passage 103 and is then adsorbed by an adsorptive material in the canister 102. When the pump 106 is driven upon starting of an engine, fuel vapor adsorbed by the adsorptive material is desorbed (purged) by atmospheric air (outside air) that is drawn from the atmospheric passage 107 to flow through the canister 102, and a fuel vapor containing gas is pressure-fed to the separation membrane module 111. Since the separation membrane 104 selectively separates a fuel component, the fuel vapor containing gas introduced into the separation membrane module 111 is separated into a concentrated gas (high concentration gas) that has permeated through the separation membrane 104, and a low concentration gas that has not permeated through the separation membrane 104. The concentrated gas is recovered into the fuel tank 101 through the recovery passage 108 and the low concentration gas is returned to the canister 102 through the return flow passage 109.

Since a gas containing fuel vapor desorbed from the canister 102 is concentrated and recovered through the separation membrane in this way, recovery efficiency of the fuel vapor may be improved. However, there has been a need for further efficiently recovery the fuel vapor. A fuel vapor processing apparatus for recovering fuel vapor at high efficiency is disclosed in, for example, JP-A-2004-324488 in the name of the same assignee as the present application. According to this document, an improvement in recovery efficiency of a fuel component is achieved by providing two separation membranes in series for concentrating a fuel vapor containing gas in two stages. Specifically, a low concentration gas separated by a first separation membrane is fed to a second separation membrane to be separated into a medium concentration gas and a low concentration gas. The medium concentration gas separated by the second separation membrane is fed again to the first separation membrane through a circulation passage and the low concentration gas separated by the second separation membrane is returned to the canister through the return flow passage.

On the other hand, there has been proposed to improve a separation membrane itself in separation capacity although it is not intended to selectively separated a fuel component generated from a gasoline fuel of an automobile. For example, JP-A-6-246126 discloses a separation membrane for selective separation of an organic vapor component from a mixed gas containing organic vapor generated from an organic solvent such as aliphatic hydrocarbons, aromatic hydrocarbons, hydrocarbon halides, etc. While the separation capacity of the separation membrane may vary according to various factors such as a flow rate of a supplied gas, a differential pressure between a supply side and a permeation side, a temperature of the supplied gas, a concentration of supplied gas, etc., JP-A-6-246126 has proposed to increase separation capacity of a flat membrane type separation membrane than that of a spiral type membrane module by feeding a mixed gas inside hollow yarns in a hollow yarn membrane module having a predetermined inside diameter. It is indicated in JP-A-6-246126 that the ratio of permeated gas flow rate and supplied gas flow rate is to be set within a range from 5 to 50% (0.05 to 0.5). In one embodiment of this document, a hollow yarn membrane having an effective length of 85 cm and an effective membrane area of 0.48 m² is used, and a flat membrane type separation membrane having a square configuration (1 m×1 m) is used as a comparative example.

Likewise, although it is not intended to selectively separate a fuel component, JP-A-2004-216116 discloses a separation membrane (oxygen enriched membrane), through which oxygen in an air is selectively permeated. The principle of separation by a separation membrane is based on a phenomenon that when a supplied gas flows along a surface of a separation membrane under a predetermined relative pressure, a predetermined component is permeated through the separation membrane because of high solution and diffusion coefficient for the separation membrane but the remaining components are not permeated through the separation membrane because of low solution and diffusion coefficient for the separation membrane. Therefore, in order to improve a separation membrane in processing capacity (permeated gas flow rate) per unit time, it may be considered to increase an area of the separation membrane. However, although the increase in an area of the separation membrane leads to increase in the permeated gas flow rate per unit time, it leads to decrease in the permeated gas concentration. The separation membrane has a tendency that a separation capacity increases as a concentration a component contained in a supplied gas and separated by the separation membrane becomes higher. Accordingly, as shown in, for example, FIG. 26, when a separation membrane is elongated in a direction of a supplied gas, a concentration of a component (intended to be separated) contained in a supplied gas flowing along a surface of the separation membrane decreases since a major part of the component passes through the separation membrane in the course of going downstream along the flow of the supplied gas. Thereby, the separation capacity of the separation membrane degrades in a direction toward downstream. This is fundamentally the same for whatever configuration of a separation membrane or a separation membrane module is. For example, even a hollow yarn membrane as disclosed in JP-A-6-246126 described above can be thought in the same manner as a flat membrane when it is cut and developed in a plane. Therefore, JP-A-2004-216116 proposes to improve the separation efficiency of oxygen molecules by forming an oxygen enriched membrane to be substantially rectangular in shape and arranging the membrane so that a short side direction (short side) thereof is substantially parallel to a flow direction of air and a long side direction (long side) of the oxygen enriched membrane is substantially perpendicular to the flow direction of air.

In JP-A-2004-324488, a fuel vapor containing gas is concentrated in two stages and a medium concentration gas is circulatingly fed again to the first separation membrane for improving recovery efficiency of fuel vapor. However, the separation capacity of the separation membranes themselves is not specifically taken into consideration and so there remains room for improvement. In contrast, JP-A-6-246126 proposes an improvement in separation efficiency of a separation membrane itself However, this improvement is attained by restricting a configuration of a separation membrane module and a gas supplying method. This countermeasure lacks versatility and is low in freedom of design since a configuration of a separation membrane module and a gas supplying method are restricted. In addition, a hollow yarn membrane having an effective length of 85 cm and an effective membrane area of 0.48 m², which substantially corresponds to an effective width of about 56 cm, is used as a specific separation membrane. That is, a size in a direction along flow of supplied gases is shorter in comparison with a size in a direction, which intersects (perpendicular thereto) the direction. Accordingly, the separation membrane disclosed in JP-A-6-246126 is degraded in separation efficiency. On the other hand, with the disclosure of JP-A-2004-216116, oxygen is efficiently separated by an oxygen enriched membrane that is rectangular in shape and arranged so that a short side direction (short side) is substantially parallel to a flow direction of air and a long side direction (long side) is substantially perpendicular to the flow direction of air. However, only a rectangular shape is disclosed for the oxygen enriched membrane. No other configuration is not assumed.

Further, JP-A-2004-324488, JP-A-6-246126 and JP-A-2004-216116 do not take into specific consideration to a quantity of a supplied gas, which may affect a separation capacity of a separation membrane. Although JP-A-6-246126 defines a certain preferable range, specific conditions are not taken into consideration. If a flow rate of a supplied gas is low, a flow rate of a permeated gas becomes low, and therefore, it is not possible to maximally increase the processing capacity of a separation membrane. On the other hand, if a flow rate of a supplied gas are too high, waste in power consumption or energy cost may result since there is a certain limit in the processing capacity (permeated gas flow rate). Accordingly, from a viewpoint of separation efficiency, it is desired that the flow rate of supplied gas is set within a range that enables to maximally increase the processing capacity of a separation membrane. Further, from a viewpoint of energy cost, it is preferable that the flow rate of supplied gas is restricted to be necessary minimum that can maximally increase the processing capacity of a separation membrane.

Therefore, there is a need in the art for a fuel vapor processing apparatus that can efficiently separate and recover fuel vapor while maximally increasing the processing capacity of a separation membrane.

While Embodiments 5 to 12 shown in FIGS. 7 to 24 will be described below, they are not limitative but various modifications can be made. In particular, the fundamental construction of a fuel vapor processing apparatus is applicable to various configurations as well as the Embodiments described later. In addition, the fuel vapor processing apparatus may be mounted on a vehicle that incorporates an idling stop system, a hybrid system, or a direct injection engine.

(Evaluation Test of the Relationship Between an Area of a Separation Membrane and a Concentration of a Permeated Gas)

First, the relationship between an area of a separation membrane and a concentration of a permeated gas was evaluated. The separation membrane used herein had the following properties.

Figure 7:
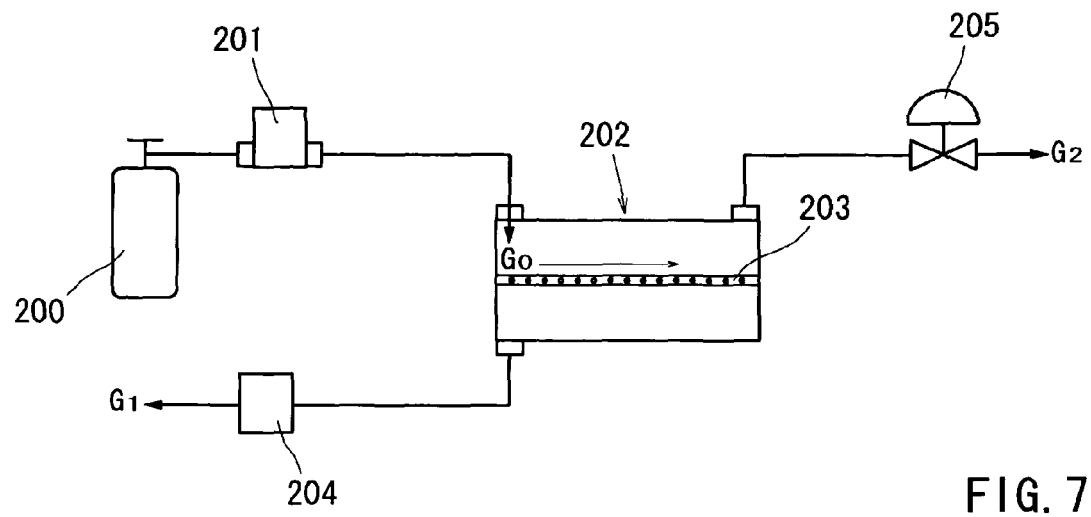
FIG. 7 is a view showing a schematic configuration of a testing device used in a permeability evaluation test.
Figure 8:
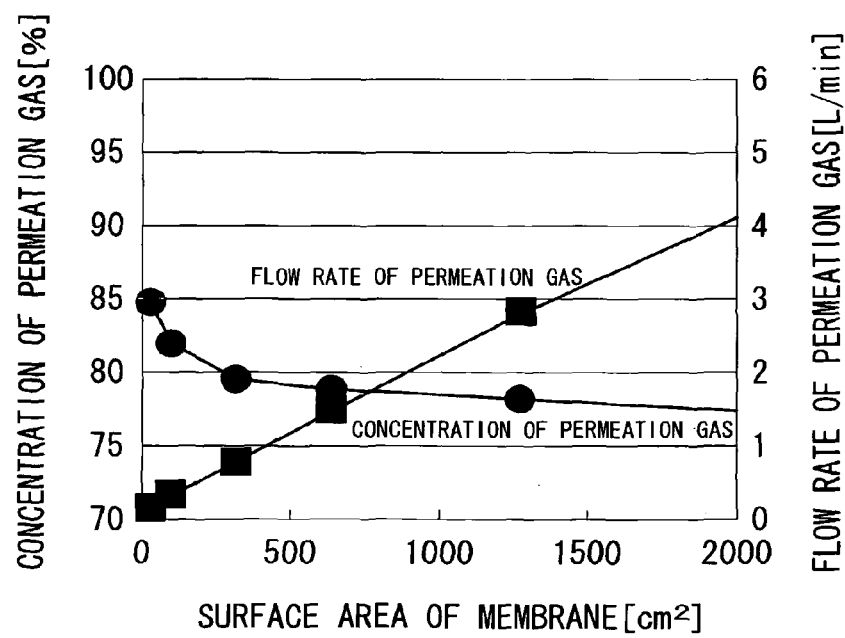
FIG. 8 is a graph illustrating changes in permeated gas concentration and flow rate of permeated gas, versus membrane area.

Material: silicon
Separation system: Solution and diffusion system
Gas permeability: n-butane; 5.35 cc/cm²/h/kPa (quantity of permeation/membrane area/time/pressure)
  nitrogen; 0.22 cc/cm²/h/kPa (quantity of permeation/membrane area/time/pressure)
Coefficient of separation: 24 (5.35/0.22)
Shape: Square flat membrane Test conditions were as follows:
Relative pressure: 150 kPa
Flow rate of supplied gas: 40 L/min
Supplied gas: mixed gas of 40 vol % of n-butane and 60 vol % of nitrogen Under the above conditions, evaluations were made by using an evaluation device, a schematic configuration of which is shown in FIG. 7. More specifically, in each evaluation, a supplied gas $G_0$ was supplied from a gas bomb 200 to a separation membrane module 202 via a flow controller 201. Within the separation membrane module 202, the supplied gas $G_0$ flowed along a surface of a separation membrane 203, during which the supplied gas was separated into a permeated gas (concentrated gas) $G_1$ and a low concentration gas $G_2$. The flow rate of and gas concentration of the permeated gas $G_1$ was measured by a flow concentration meter 204. The low concentration gas $G_2$ was discharged directly from the separation membrane module 202. Relative pressure was regulated by a pressure regulating valve 205. In addition, throughout the evaluations, the length and width of the separation membrane used for evaluations were not changed for changing the membrane area. Instead, the number of the separation membranes having the same length and width was changed for changing the membrane area. FIG. 8 shows the results of the evaluation tests.

Figure 9:
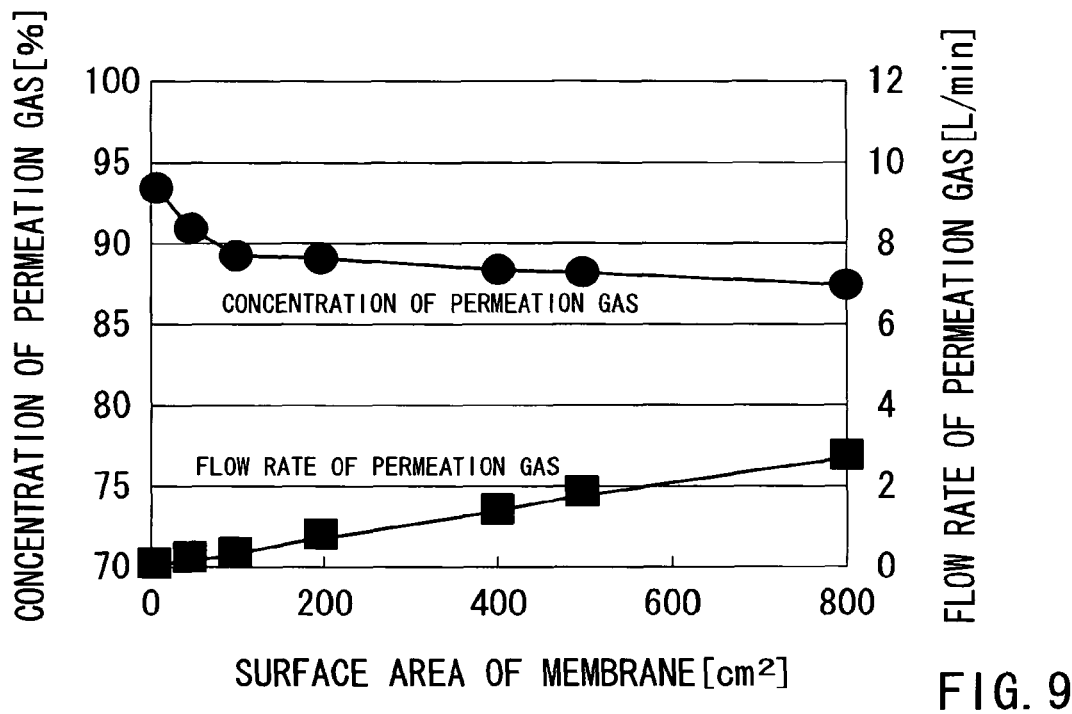
FIG. 9 is a graph illustrating behaviors in permeated gas concentration and flow rate of permeated gas, versus membrane area with supplied gas concentration being different from that in FIG. 8.

In addition, the separation capacity of the separation membrane varies according to a concentration of a component in a supplied gas. Therefore, evaluations were made with respect to the case where a supplied gas is a mixture of 50 vol % of n-butane and 50 vol % of nitrogen. FIG. 9 shows the results.

According to the results shown in FIGS. 8 and 9, when the membrane area of the separation membrane(s) increases, the processing capacity (permeated gas flow rate) per unit time increases, while the concentration of the permeated gas (concentration of n-butane) decreases for any concentration of the supplied gas. This may be caused because if a length in parallel to a flow direction of the supplied gas increases, the separation efficiency decreases as the supplied gas flows downstream. In this manner, it was found that even in the case of using a square-shaped separation membrane, increasing only the membrane area is not enough to prevent the separation efficiency from decreasing. Thereby, in case of designing the shape and the size of a separation membrane, it was found that a size in a direction in parallel to a flow direction of a supplied gas should be set to be shorter than a size in a direction perpendicular to the flow direction of the supplied gas. Taking into account of this, the Embodiments 5 to 13 will be described below.

Embodiment 5

Figure 10:
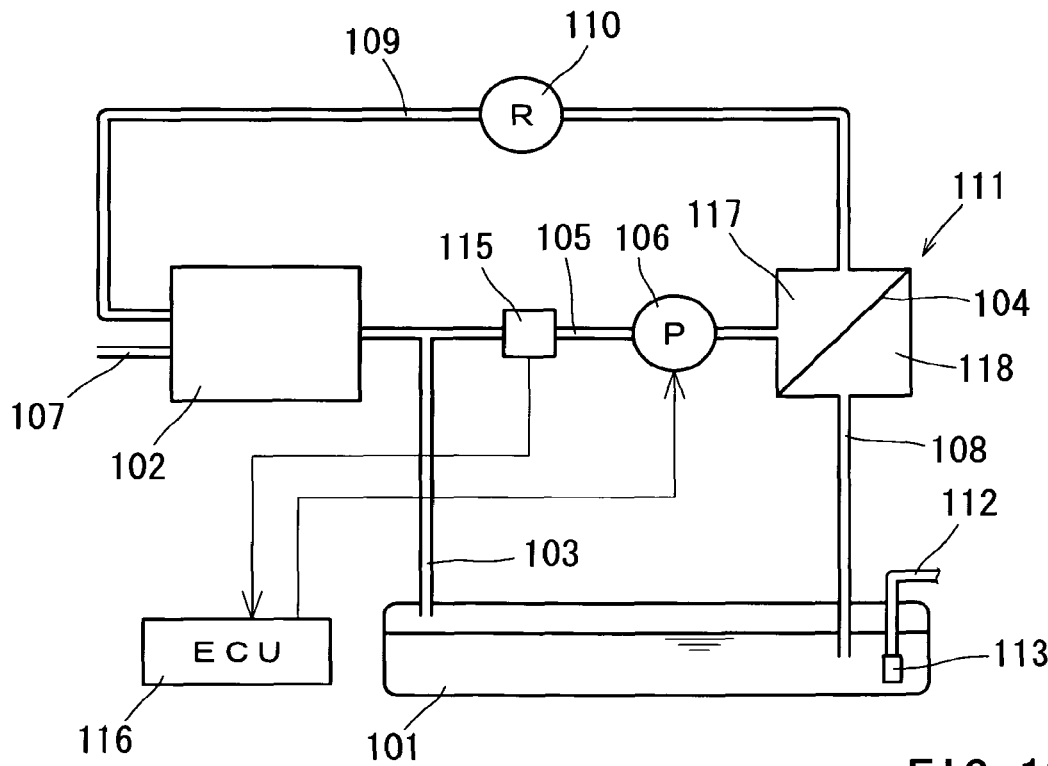
FIG. 10 is a view showing a schematic configuration of Embodiment 5.

FIG. 10 is a view showing an outline configuration of a fuel vapor processing apparatus according to Embodiment 5. As shown in the FIG. 10, Embodiment 5 incorporates the fundamental construction of the fuel vapor processing apparatus described in the Background Art and shown in FIG. 25. Accordingly, an explanation of the details of the fundamental construction will be omitted. In FIG. 10, like members are given the same reference numerals as FIG. 25 and an explanation will be focused on a difference structure from that shown in FIG. 25. The pump 106 may be called as gas supply device.

A concentration sensor 115 for detection a concentration of fuel vapor contained in a supplied gas (fuel vapor containing gas) is provided in the purge passage 105 between the canister 102 and the separation membrane module 111. A detection signal of the concentration sensor 115 is permeated to an electronic control unit (hereinafter called as ECU) 116. Timing of the operation and the output of the pump 106 are controlled by the ECU 116. The concentration sensor 115 may be called as a supplied gas concentration detecting device.

As the separation membrane 104 is hydrocarbon separation membrane is used. A fuel component contained in a fuel vapor containing gases is preferentially permeated through the separation membrane 104. However, an air component is hard to permeate through the separation membrane 104. More specifically, the separation membrane 104 includes a non-porous thin membrane layer for enabling preferential, selective permeation of a fuel component therethrough. The separation membrane 104 also includes a porous support membrane layer that supports the thin membrane layer. Alternatively, the separation membrane 104 may have a three-layered structure with a non-woven fabric such as polyester, etc. laminated with the above membrane layers. As the thin membrane layer provides a primary separation function for the separation membrane 104 and has a good selectivity and permeability. For example, a silicon-based polymer material bridged to be insolubilized three dimensionally can be used for the thin membrane layer. The thin membrane layer has a thickness of about 0.5 to 3 µm. On the other hand, a high solvent resistance is required for the porous support layer. For example, ceramic as well as synthetic resins such as polyimide (PI), polyetherimide (PEI), or polyvinylidene fluoride (PVDF) may be used for the porous support layer. Because a fuel component is high in solution coefficient and diffusion coefficient for the separation membrane 104, it can easily cause solution, diffusion and desolution into the separation membrane 104, and therefore, the permeation speed is high. In contrast, an air component such as nitrogen, oxygen, etc. is lower in solution coefficient and diffusion coefficient for the separation membrane 104 than the fuel vapor component and it is hard to permeate through the separation membrane 104. Thereby, a fuel component in a fuel vapor containing gas is preferentially separated by the separation membrane 104, so that a high concentration gas (concentrated gases) can be produced. On the other hand, an air component is not separated by the separation membrane 104, so that a low concentration gas can be produced.

Figure 11:
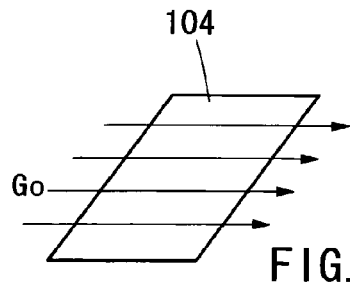
FIG. 11 is a conceptual view showing the relationship between a separation membrane and flow direction of a supplied gas in Embodiment 5.

The separation membrane 104 is configured as a flat membrane type separation membrane having a rectangular configuration and is arranged as shown in FIG. 11 so that a short side direction (short side) is substantially parallel to a flow direction of a supplied gas $G_0$ and a long side direction (long side) is substantially perpendicular to the flow direction of the supplied gas $G_0$. That is, the separation membrane 104 has a configuration in which a size in a lengthwise direction in parallel to the flow direction of the supplied gas $G_0$ is shorter than a size in a widthwise direction perpendicular to the flow direction of the supplied gas $G_0$. The separation membrane module 111 is divided into a reception chamber (low concentration gas chamber) 117 and a permeation chamber (concentrated gas chamber) 118 by the separation membrane 104. In addition, while the separation membrane module 111 is conceptually shown in FIG. 10, it actually has the same construction as that of the separation membrane module 202 shown in FIG. 7.

The ECU 116 has a central processing unit (CPU), a read only memory (ROM), a random access memory (RAM), etc. A predetermined control program is beforehand stored in the ROM and the CPU performs a computation processing in the RAM on the basis of the control program to operatively control the timing of operation of and the output of the pump 106. The control program includes data relating to permeability and corresponding to the concentration of a fuel vapor in a supplied gas.

(Evaluation Tests Regarding the Relationship Between the Flow Rate of the Supplied Gas and the Flow Rate of the Permeated Gas)

Figure 12:
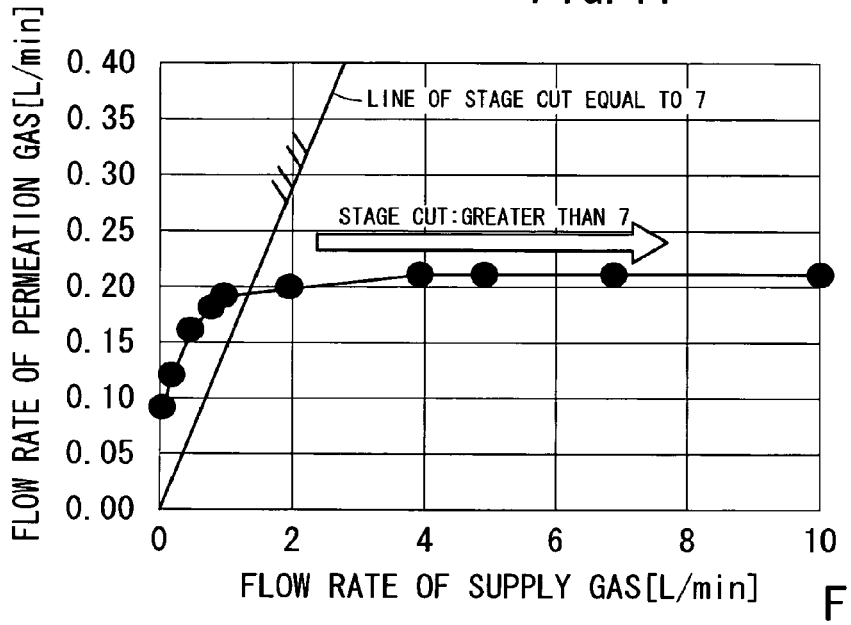
FIG. 12 is a graph illustrating changes in flow rate of permeated gas, versus flow rate of supplied gas.

Prior to describing the control of the flow rate of the supplied gas performed by the ECU 116, tests for evaluations of permeability will be described. Properties of a separation membrane, test conditions, a testing device in this evaluation test are the same as those used in the evaluation test regarding the relationship between an area of a separation membrane and a concentration of a permeated gas described above. A separation membrane had a square configuration (10 cm×10 cm) and a mixture of 40 vol % of n-butane and 60 vol % of nitrogen was used as a supplied gas. FIG. 12 shows the results of evaluations.

According to the results shown in FIG. 12, within a range, in which the flow rate of the supplied gas is relatively small, the flow rate of the permeated gas markedly increases as the flow rate of the supplied gas increases, and therefore, the flow rate of the permeated gas intensely varies with variation in the flow rate of the supplied gas. In contrast, in a range, within which the flow rate of the supplied gas is larger than a predetermined value, the flow rate of the permeated gas does not so much increase but is stable even when the flow rate of the supplied gas increases, and so it means that the predetermined flow rate value is a limit of processing capacity of the separation membrane. It was found that the border between a range, in within which the flow rate of the permeated gas intensely varies relative to the flow rate of the supplied gas, and a range, within which the flow rate of the permeated gas is stable, is about 7 in stage cut. Here, the term "stage cut" means a ratio of the flow rate of the supplied gas to the flow rate of the permeated gas.

Figure 13:
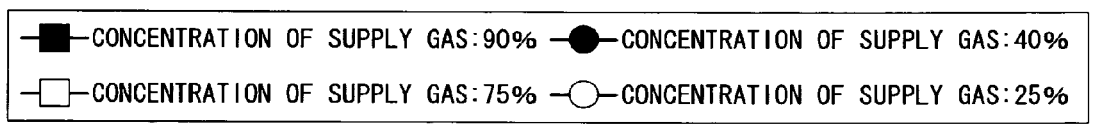
FIG. 13 is a graph illustrating changes in flow rate of permeated gas, versus flow rate of supplied gas with different supplied gas concentrations.
Figure 13:
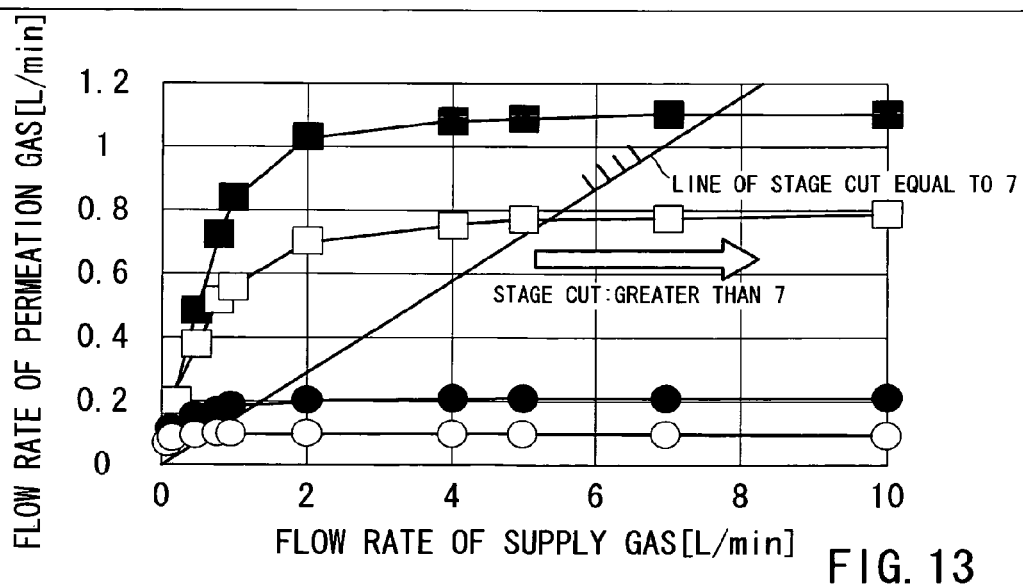
Figure 14:
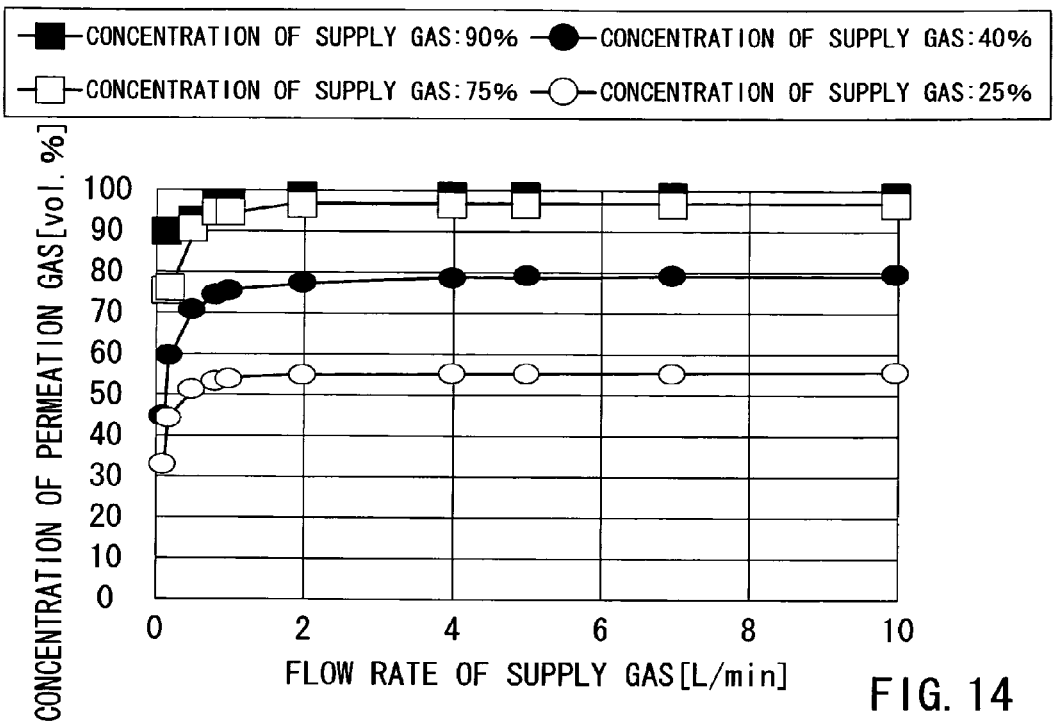
FIG. 14 is a graph illustrating changes in permeated gas concentration, versus flow rate of supplied gas with different supplied gas concentrations.

The permeability may vary according to variation of the concentration of the supplied gas. Therefore, the permeability was evaluated in the case where the concentration of the supplied gas is variously changed under the same conditions as described above. FIG. 13 illustrates the results and FIG. 14 illustrates the results of the characteristics of the permeated gas concentration according to variation of the flow rate of the supplied gas as measured at the same time. According to the results shown in FIG. 13, if the stage cut is at least 7 (7 or more), the flow rate of the permeated gas is stable irrespective of change of supplied gas concentration. Therefore, it was found that in order to stabilize the separation capacity of a separation membrane while maximally increasing the processing capacity of the separation membrane, it is necessary to set the stage cut to be equal to or larger than 7. Also, it was found that the stage cut is preferably 7 to 20, more preferably 7 to 10, and most preferably as close to 7 as possible from a viewpoint of saving the energy cost.

Therefore, the permeability corresponding to the concentration of supplied gas is determined previously, and the results of determination is stored in the ROM of the ECU 116. Preferably, as many values relating permeability as possible are determined and stored by finely changing the concentration of the supplied gas. When the concentration of fuel vapor contained in a supplied gas is detected by the concentration sensor 115, the ECU 116 refers to the permeability corresponding to the concentration of the supplied gas, such as that shown in FIG. 13, which is stored in the ECU 116. Then, the CPU 116 controls an output of the pump 106 on the basis of the result of the reference in order to control the flow rate of the supplied gas such that the stage cut becomes to be at least 7, preferably 7 to 20, more preferably 7 to 10, and most preferably about 7. For example, in the case where the concentration of the supplied gas is as high as 90%, the flow rate of the supplied gas is set to be about 7.5 l/min. As the separation and recovery process of the fuel vapor continues, the concentration of the supplied gas decreases with time, so that the flow rate of the supplied gas reduces correspondingly. For example, if the concentration of the supplied gas is decreased to be as low as 25%, the flow rate of the supplied gas is correspondingly controlled to be about 0.8 L/min.

Embodiment 6

Figure 15:
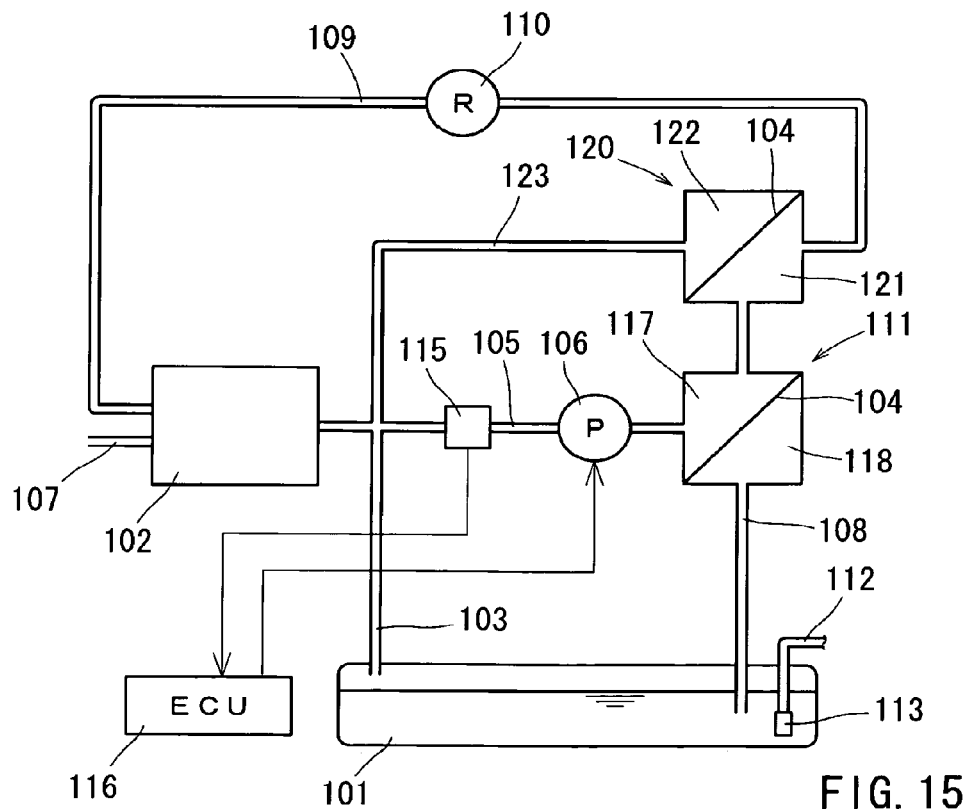
FIG. 15 is a view showing a schematic configuration of Embodiment 6.

FIG. 15 is a view showing a schematic configuration of a fuel vapor processing apparatus according to Embodiment 6. Embodiment 6 is a modification of Embodiment 5 and relates to a fuel vapor processing apparatus, in which a fuel vapor is concentrated in two stages as in JP-A-2004-324488. In FIG. 15, like members are given the same reference numerals as FIG. 10.

As shown in FIG. 15, the separation membrane module 111 serves as a first separation device and another separation membrane module 120 is further provided as a second separation device. The same separation membrane 104 as that of the separation membrane module 111 is provided in the second separation membrane module 120. The second separation membrane module 120 is divided into a reception chamber (low concentration gas chamber) 121 and a permeation chamber (concentrated gas chamber) 122 by the separation membrane 104 provided therebetween. The low concentration gas chamber 117 of the first separation membrane module 111 is communicated to the reception chamber 121 of the second separation membrane module 120. That is, the first separation membrane module 111 and the second separation membrane module 120 are arranged in series. Also, the return flow passage 109 is connected to the reception chamber 121 of the second separation membrane module 120. One end of a circulation passage 123 is connected to the permeation chamber 122 of the second separation membrane module 120. The other end of the circulation passage 123 is communicated to the purge passage 105 upstream of the pump 106.

The low concentration gas separated by the first separation membrane module 111 is fed to the reception chamber 121 of the second separation membrane module 120 from the low concentration gas chamber 117 and further separated and concentrated by the separation membrane 104. The concentrated gas permeated through the separation membrane 104 of the second separation membrane module 120 is again circulatingly fed to the first separation membrane module 111 through the circulation passage 123 and the remaining fuel component is again separated and recovered by the separation membrane 104. A very low concentration gas is returned from the low concentration gas chamber 121 of the second separation membrane module 120 to the canister 102 through the return flow passage 109. The other constructions and operations including a flow control of the supplied gas based on the stage cut are the same as those in Embodiment 5.

In addition, in the case where a plurality of separation membrane modules are provided in series as in Embodiment 6, it is not necessary to design the separation membrane of the second separation membrane module in a manner described above. Thus, it is only necessary that the size in a direction parallel to the flow direction of the supplied gas of at least the separation membrane of the first separation membrane module disposed most-upstream in a flow path of a supplied gas is shorter than a size in a direction perpendicular to the flow direction of the supplied gas. This is because the second separation membrane module is provided supplementally and the fuel component can be separated and recovered primarily by the first separation membrane module.

Embodiment 7

Figure 16:
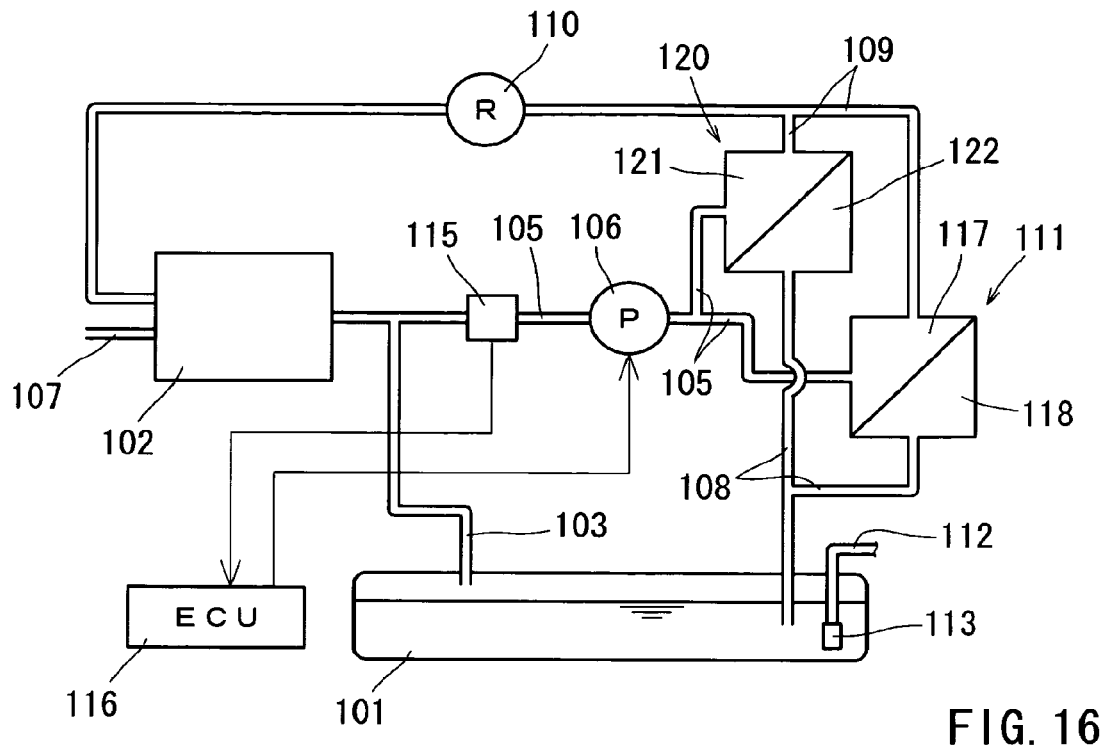
FIG. 16 is a view showing a schematic configuration of Embodiment 7.
Figure 17:
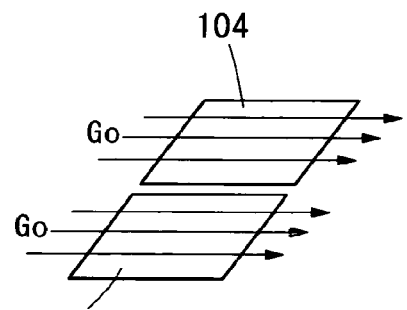
FIG. 17 is a conceptual view showing the relationship between a separation membrane and flow direction of supplied gas in Embodiment 7.

FIG. 16 is a view showing a schematic configuration of a fuel vapor processing apparatus according to Embodiment 7. Embodiment 7 is a further modification of Embodiment 5 and is different from Embodiment 5 in that two separation membrane modules 111, 120 are provided in parallel with respect to a flow path of the supplied gas. It is also possible to regard Embodiment 7 as a modification of Embodiment 6. In FIG. 16, like members are given the same reference numerals as FIG. 15. As shown in FIG. 16, the purge passage 105 branches at a midway position and is connected to both the reception chamber 117 of the first separation membrane module 111 and the reception chamber 121 of the second separation membrane module 120. Also, the return flow passage 109 is extended to the canister 102 from both the reception chamber 117 of the first separation membrane module 111 and the reception chamber 121 of the second separation membrane module 120. Further, the recovery passage 108 is extended from both the permeation chamber 118 of the first separation membrane module 111 and the permeation chamber 122 of the second separation membrane module 120. With this construction, a fuel vapor containing gas supplied from the canister 102 by the pump 106 is fed to both the first separation membrane module 111 and the second separation membrane module 120 at the same time and is separated by the respective separation membranes 104, 104 at the same time. FIG. 17 conceptually shows this arrangement. A size (width) in a direction perpendicular to a flow direction of the supplied gas $G_0$ of a combination of the separation membranes 104, 104 of this embodiment can be considered to be a total of the sizes (widths) of the two separation membranes 104, 104.

(Permeability Tests)

Figure 18:
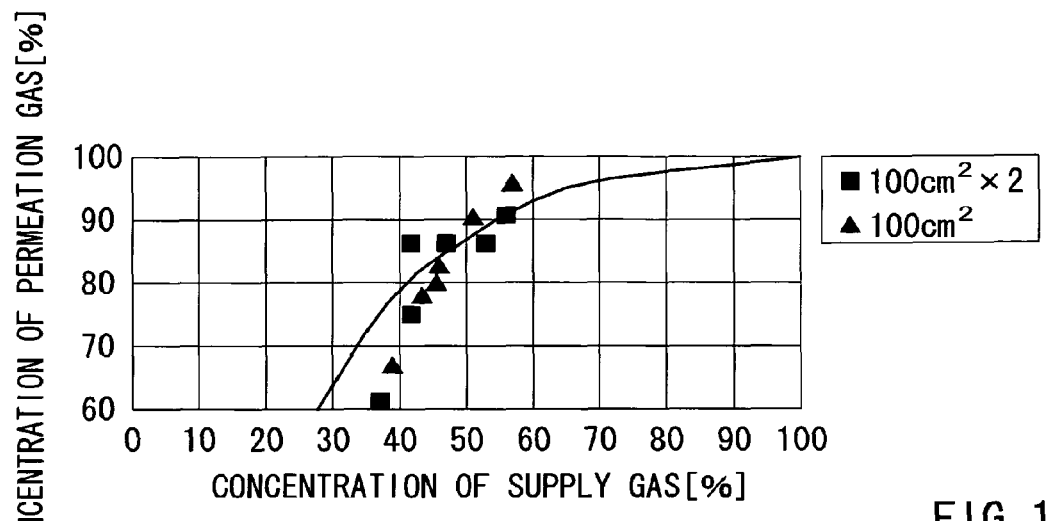
FIG. 18 is a graph illustrating changes in permeated gas concentration, versus supplied gas concentration.
Figure 19:
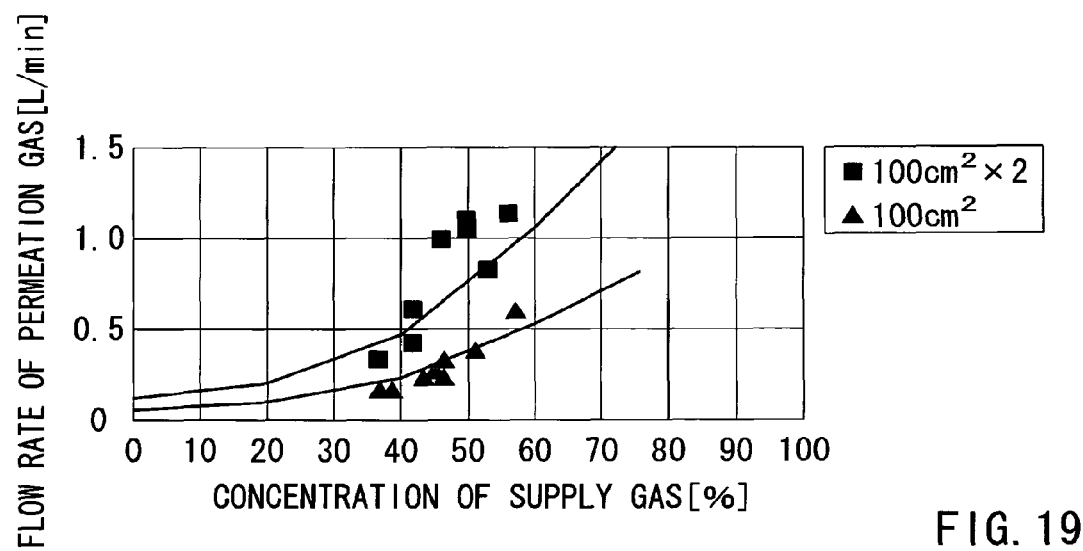
FIG. 19 is a graph illustrating changes in flow rate of permeated gas, versus supplied gas concentration.

In order to confirm this, evaluation tests were made with respect to gas permeability in the case where separation is made by a single separation membrane and in the case where separation is made with the use of two separation membranes of the same shape and aligned in parallel to each other. Here, the properties of the separation membrane(s), test conditions, sizes of the separation membrane(s), and a supplied gas in the tests were the same as those in the previously described evaluation tests for the relationship between the flow rate of the supplied gas and the flow rate of the permeated gas. The testing device shown in FIG. 7 was used for a membrane area of 100 cm². A testing device, in which separation membranes each having a membrane area of 100 cm² were arranged in parallel as shown in FIG. 17, was used for a membrane area of 200 cm². The test results are shown in FIGS. 18 and 19. According to the results shown in FIG. 19, in the case that two separation membranes having the same in shape and size are arranged in parallel, the flow rate of the permeated gas is approximately twice as that in the case that a single separation membrane having the same in shape and size as the former is used. On the other hand, according to the results shown in FIG. 18, the concentration of the permeated gas in the case that two separation membranes are arranged in parallel is approximately the same as that in the case of the use of a single separation membrane. These results do not agree with the tendency that the concentration of the permeated gas generally decreases as them membrane area increases. Thereby, it was found that when separation membranes are arranged in parallel, the sum of widths of two separation membranes behave substantially as a width of a single separation membrane.

Therefore in Embodiment 7, in view of this substantial width of the separation membrane (combination of the separation membranes 104), a size (length) in a direction parallel to the flow direction of the supplied gas is set to be substantially shorter than a size (width) in a direction perpendicular to the flow direction of the supplied gas. Thereby, it is possible to improve the separation efficiency of the separation membrane. Accordingly, for each of the separation membranes 104, 104, a length is preferably smaller than a width but this is not necessary to be set in this way. Thus, since it is enough if a length of the combination of the separation membranes 104 is substantially smaller than a width of the same, the separation membranes 104, 104 may have different sizes from each other. The other constructions and operations including a flow control of the supplied gas based on the stage cut is the same as that in Embodiment 5.

Embodiment 8

Figure 20:
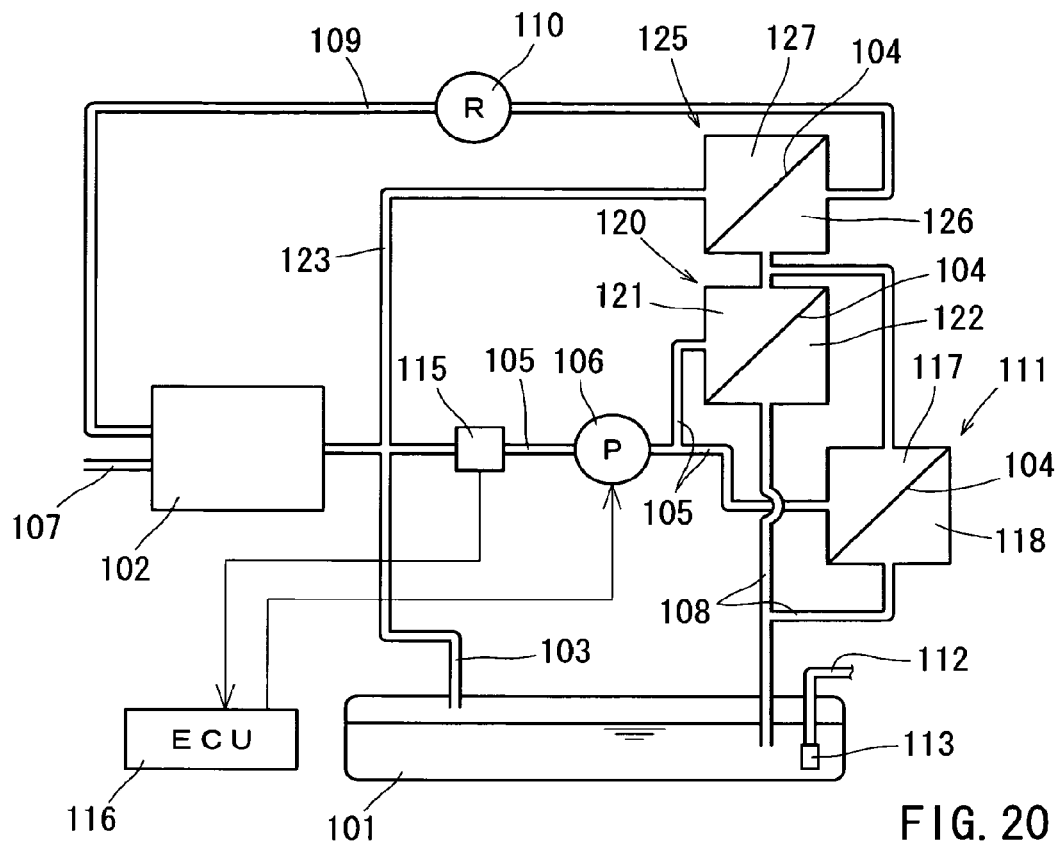
FIG. 20 is a view showing a schematic configuration of Embodiment 8.

FIG. 20 is a view showing a schematic configuration of a fuel vapor processing apparatus according to Embodiment 8. Embodiment 8 corresponds to a combination of Embodiment 6 and Embodiment 7. In FIG. 20, like members are given the same reference numerals as FIG. 15 or 16. As shown in FIG. 20, the first separation membrane module 111 and the second separation membrane module 120 are arranged in parallel, and a third separation membrane module 125 is further provided in series with and on the downstream side of the separation membrane modules 111, 120. Specifically, a reception chamber 126 of the third separation membrane module 125 is communicated to the permeation chamber 117 of the first separation membrane module 111 and also to the permeation chamber 122 of the second separation membrane module 120. The return flow passage 109 is connected to the reception chamber 126 of the third separation membrane module 125. The reflux passage 123 is connected to a permeation chamber 127 of the third separation membrane module 125. The first and second separation membrane modules 111, 120 arranged in the parallel relationship are positioned most-upstream in a flow path of the supplied gas. The other constructions and operations including the relationship between a length and a width of each of the separation membranes 104, and a flow control of the supplied gas based on the stage cut are the same as those in Embodiment 6 and Embodiment 7.

Embodiment 9

Figure 21:
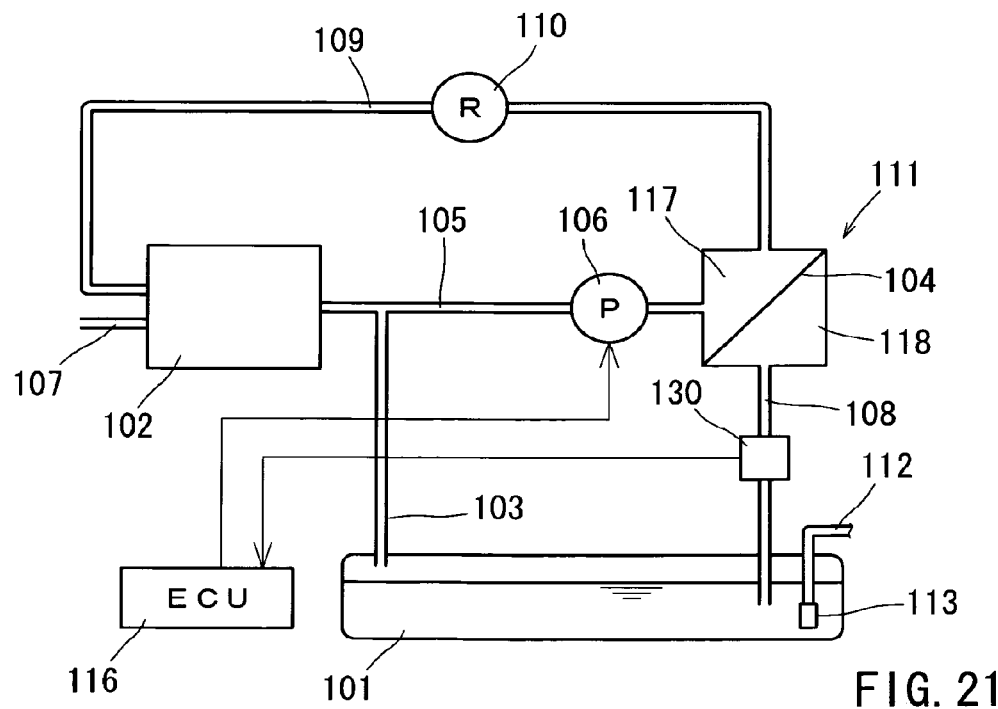
FIG. 21 is a view showing a schematic configuration of Embodiment 9.

FIG. 21 is a view showing a schematic configuration of a fuel vapor processing apparatus according to Embodiment 9. Embodiment 9 is a modification of Embodiment 5 and is different from Embodiment 5 in that a concentration sensor 130 for detection of concentration of fuel vapor contained in the permeated gas is provided instead of the concentration sensor 115 for detection of concentration of fuel vapor contained in the supplied gas. In FIG. 21, like members are given the same reference numerals as FIG. 20. That is, instead of the concentration sensor 115 provided on the purge passage 105, the concentration sensor 130 is provided on the recovery passage 108 as shown in FIG. 21. The concentration sensor 130 serves as a permeated gas concentration detecting device.

In the case of Embodiment 9, behavioral characteristics of the flow rate of the permeated gas corresponding to the flow rate of the supplied gas as shown in FIG. 13 and behavioral characteristics of the concentration of the permeated gas corresponding to the flow rate of the supplied gas as shown in FIG. 14, which behavioral characteristics were determined by the evaluation tests of the relationship between the flow rate of the supplied gas and the flow rate of the permeated gas, are beforehand stored in the ROM of the ECU 116. Preferably, as many values regarding the permeability as possible are determined and stored by finely changing the concentration of the supplied gas. When the concentration of fuel vapor contained in the permeated gas is detected by the concentration sensor 130, the ECU 116 refers to the permeability beforehand stored and corresponding to the concentration of the permeated gas as in FIG. 14 and the permeability as shown in FIG. 13 to control an output of the pump 106 on the basis of the results of the reference to thereby control the flow rate of the supplied gas so that the stage cut is set to at least 7, preferably, 7 to 20, more preferably 7 to 10, and most preferably about 7. Since the other constructions and operations including the construction of the fuel vapor processing apparatus are the same as those in Embodiment 5.

Embodiments 10 to 12

Figure 22:
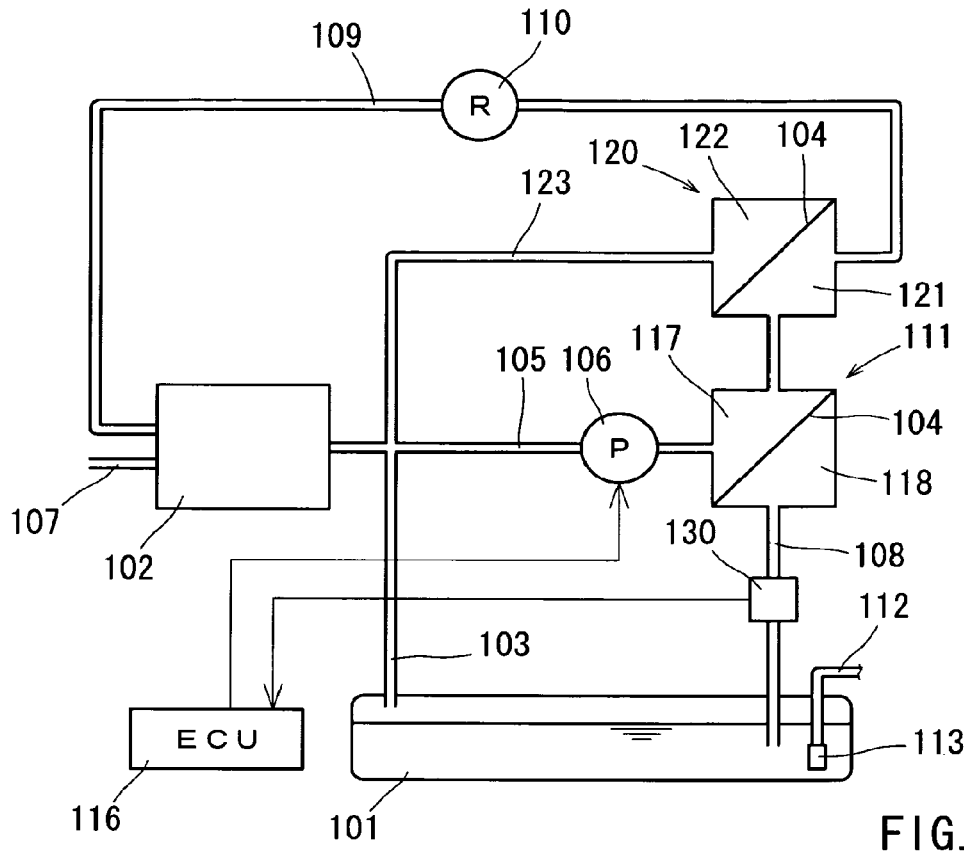
FIG. 22 is a view showing a schematic configuration of Embodiment 10.
Figure 23:
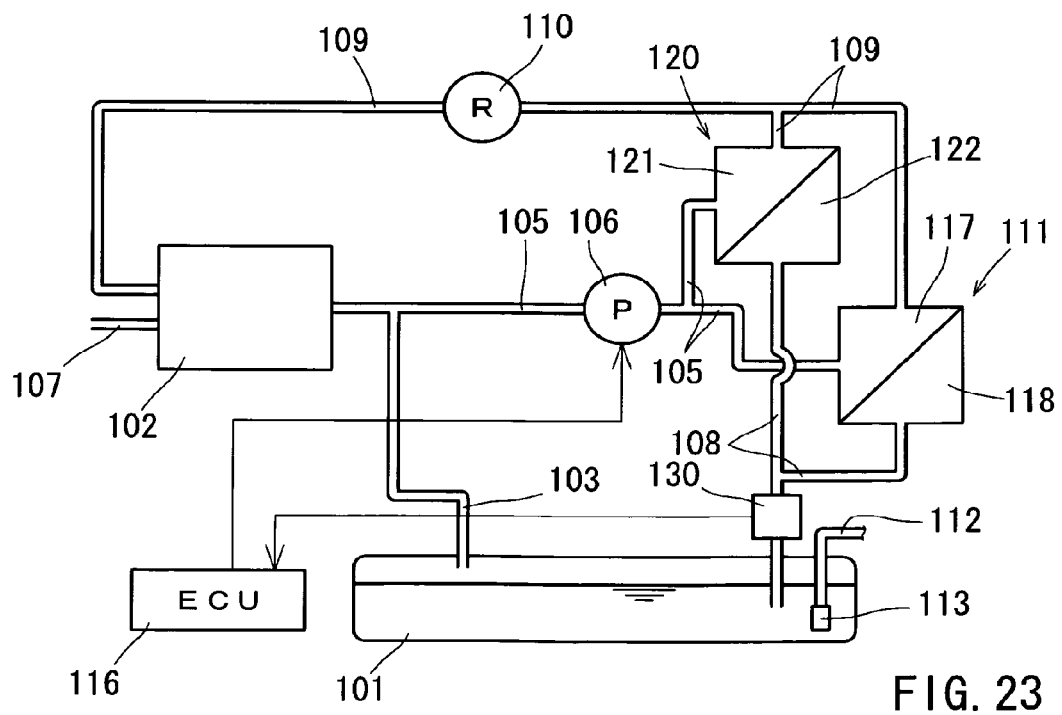
FIG. 23 is a view showing a schematic configuration of Embodiment 11.
Figure 24:
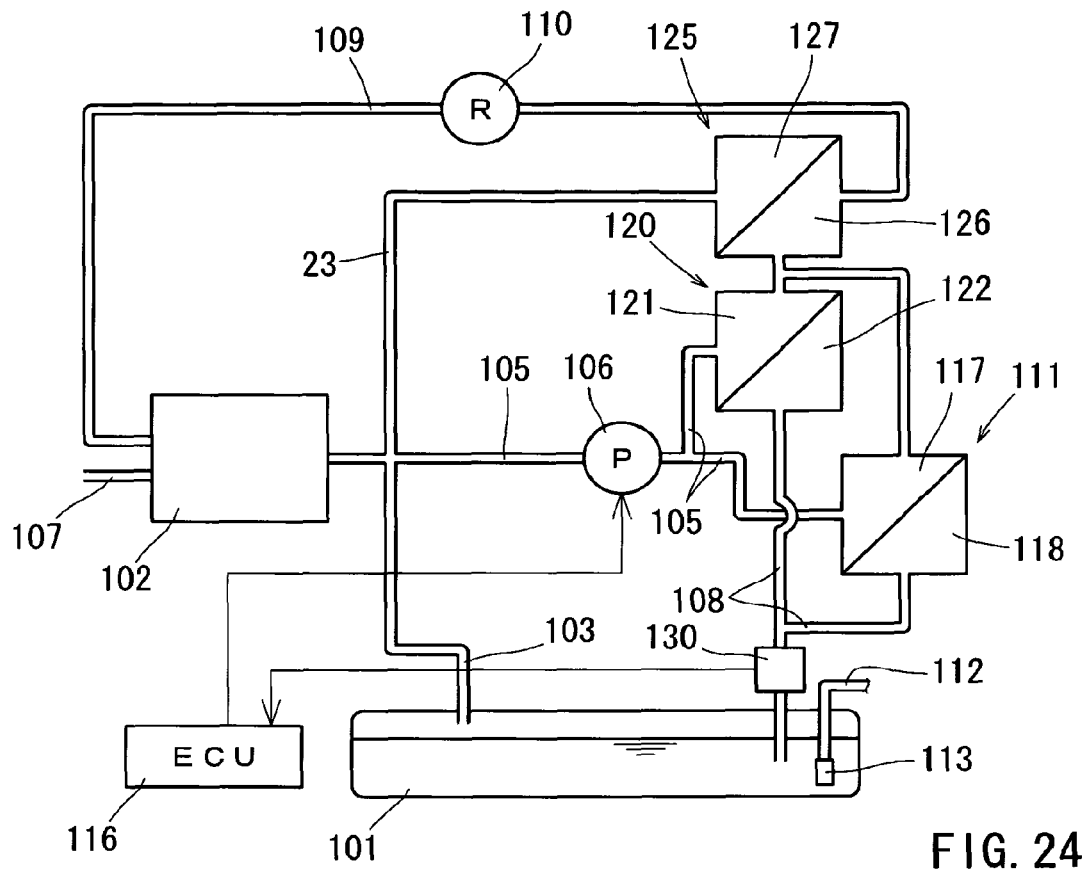
FIG. 24 is a view showing a schematic configuration of Embodiment 12.

Also with Embodiments 10 to 12, it is possible to control the flow rate of the supplied gas in the same manner as in Embodiment 9. FIG. 22 is a view showing a schematic configuration of a fuel vapor processing apparatus according to Embodiment 10, FIG. 23 is a view showing a schematic configuration of a fuel vapor processing apparatus according to Embodiment 11, and FIG. 24 is a view showing a schematic configuration of a fuel vapor processing apparatus according to Embodiment 12. Embodiment 10 is a modification of Embodiment 6, Embodiment 11 is a modification of Embodiment 7, and Embodiment 12 is a modification of Embodiment 8. In the Embodiments 10 to 12, similar to Embodiment 9, the concentration sensor 130 for detection of the concentration of fuel vapor in the permeated gas is provided on the recovery passage 108 as shown in FIGS. 22 to 24, so that it is possible to control the flow rate of the supplied gas in the same manner as in Embodiment 9. Except for the concentration sensor 130, the constructions of Embodiments 10 to 12 are the same as those of Embodiments 6 to 8, respectively, and therefore, like members are given the same reference numerals as these embodiments.

(Other Possible Modifications of Embodiments 5 to 12)

It is possible to make various modifications to Embodiments 5 to 12. For example, although the flow rate of the supplied gas is controlled on the basis of the concentration of the supplied gas detected by the concentration sensor 115 provided in the purge passage 105 in Embodiments 5 to 8 and on the basis of the concentration of the permeated gas detected by the concentration sensor 130 provided in the recovery passage 108 in Embodiments 10 to 12, it is possible to control the flow rate of the supplied gas on the basis of the flow rate of the permeated gas detected by a flow meter or a flow rate sensor provided in the recovery passage 108. Also, in this case, the permeability as shown in FIG. 13 may be beforehand stored in the ECU 116 in the same manner as in Embodiments 5 to 8. However, the flow rate of the supplied gas is controlled by making calculation in the ECU 116 inversely to the cases of Embodiments 5 to 8.

Although a flat membrane type separation membrane(s) is(are) used in Embodiments 5 to 12, it is possible to use a hollow yarn membrane(s). In case of using a hollow yarn membrane, it is possible to configure the hollow yarn membrane as an internal pressure separation type, in which a supplied gas is introduced into a hollow interior and permeated outside, or an external pressure separation type, in which a supplied gas is introduced from outside of the hollow yarn membrane and permeated into a hollow interior. For a hollow yarn membrane, a width (i.e., a length perpendicular to the flow direction of the supplied gas) may correspond to a peripheral length of an inner peripheral surface in the case of the internal pressure separation type and a peripheral length of an outer peripheral surface in the external pressure separation type. Based on this, for a hollow yarn membrane, a size in a length direction in parallel to a flow direction of a supplied gas is set to be shorter than a size in a peripheral direction perpendicular to the flow direction of the supplied gas. Also, it is possible to use a honeycomb-like separation membrane(s). A flat membrane type separation membrane may assume a spiral form other than a form of a flat plate. Also in these cases, it is only necessary to incorporate a dimensional design similar to the case of the hollow yarn membrane.

The flow rate of the supplied gas can be controlled by means of a flow rate regulator other than the output of the pump 106. That is, the flow rate of the supplied gas may be controlled by providing a flow rate regulator in the purge passage 105 separately of the pump 106 and controlling the flow rate regulator with the use of an electronic control unit.

The followings are examples of application of the determination of the size of the separation membranes and the supply gas control system of Embodiment 6 shown in FIG. 15 or Embodiment 10 shown FIG. 22 to the constructions of Embodiments 1 to 4:

In the case of the application to the construction of Embodiment 1 (see FIGS. 1 and 2) having the first concentration membrane 20 in the form of a flat membrane, the second concentration membrane 21 in the form of an internal pressure type hollow yarn membrane, and the dilution membrane 30 in the form of an internal pressure type hollow yarn membrane arranged in series with each other, the following modifications may be made. Thus, for the first concentration membrane 20, a size in a length direction in parallel to a flow direction of a supplied gas is set to be shorter than a size in a direction perpendicular to the flow direction of the supplied gas, and for each of the second concentration membrane 21 and the dilution membrane 30 in the forms of hollow yarn membranes, a size in a length direction in parallel to a flow direction of a supplied gas is set to be shorter than a size in a peripheral direction perpendicular to the flow direction of the supplied gas. In addition, a concentration sensor is provided in the purge line 11 or the recovery line 12 to detect the concentration of the permeated gas and an ECU controls an output of the pump 3 on the basis of the detected concentration in order to control the flow rate of supplied gas so that the stage cut set to be at least 7, preferably 7 to 20, more preferably 7 to 10, and most preferably about 7. Alternatively, a flow rate regulator may be provided in the purge line separately of the pump to perform the same control.

In addition, in this case, as described in Embodiment 6, it is only necessary that at least a separation membrane (the first concentration membrane 20 in this case) of the first separation membrane module disposed most-upstream in a flow path of a supplied gas is designed such that a size in a direction in parallel to a flow direction of the supplied gas is shorter than a size in a direction perpendicular to the flow direction of supplied gas.

In the case of application to the construction in which the first concentration membrane 20 in the form of a flat membrane, the second concentration membrane 21 in the form of an external pressure type hollow yarn membrane, and the dilution membrane 30 in the form of a hollow yarn membrane are arranged in series as in Embodiment 2 (see FIGS. 3 and 4), it is possible to apply the determination of the size of the separation membranes and the supply gas control system of Embodiment 6 or Embodiment 10 in the same manner as discussed in connection with the application to Embodiment 1 except that for the second concentration membrane 21, a size in a length direction in parallel to a flow direction of a supplied gas is set to be shorter than a size in an outer peripheral direction perpendicular to the flow direction of the supplied gas.

In the case of application to the construction of Embodiment 3 (see FIG. 5), in which the internal pressure type hollow yarn membrane 23 is divided by the partition plates 62 to 65, portions of the yarn membrane 23 positioned between the partition plates may be considered as a plurality of concentration membranes arranged in series, and a size of each of these membranes in a length direction in parallel to a flow direction of a supplied gas is set to be shorter than a size in an inner peripheral direction perpendicular to the flow direction of supplied gases. The rest is the same as that in the case of application to Embodiment 1.

In the case of the application to Embodiment 4 (see FIG. 6), in which the external pressure type hollow yarn membrane 24 is divided by the partition plate 87, portions of the yarn membrane 24 in front and in rear of the partition plate 87 may be considered as two concentration membranes arranged in series, and a size of each of these membranes in a length direction in parallel to a flow direction of a supplied gas is set to be shorter than a size in an outer peripheral direction perpendicular to the flow direction of the supplied gas. The rest is the same as in the case of application to Embodiment 1.

What is claimed is:

1. A fuel vapor processing apparatus comprising:
   a canister capable of adsorbing and collecting a fuel vapor produced within a fuel tank,
   a separation membrane module capable of selectively permeating and separating a fuel component from a fuel vapor containing gas containing the fuel vapor desorbed from the canister,
   a gas supply device capable of pressure-feeding the fuel vapor containing gas from the canister to the separation membrane,
   an electronic control unit capable of controlling a flow rate of the fuel vapor containing gas supplied to the separation membrane; and
   a supplied gas concentration detecting device provided between the canister and the separation membrane and capable of detecting the concentration of the fuel vapor contained in the fuel vapor containing gas supplied to the separation membrane, and
   wherein the electronic control unit stores therein data relating to permeability and corresponding to the concentration of the fuel vapor contained in the supplied fuel vapor containing gas, and
   the electronic control unit controls the flow rate of the supplied fuel vapor containing gas on the basis of the concentration of the fuel vapor detected by the supplied gas concentration detecting device and the data relating to permeability.

2. The fuel vapor processing apparatus according to claim 1, wherein the separation membrane is structured so that a size in a direction in parallel to a flow direction of the supplied gas is configurationally or substantially shorter than a size in a direction perpendicular to the flow direction of the supplied gas.

3. The fuel vapor processing apparatus according to claim 2, wherein the separation membrane comprises a plurality of separation membranes, and
   the plurality of separation membranes are arranged in parallel from a most-upstream side in a flow path of the supplied gas.

4. The fuel vapor processing apparatus according to claim 1, wherein the electronic control unit is capable of controlling a ratio of the flow rate of the fuel vapor containing gas supplied to the separation membrane to a flow rate of a gas permeated through the separation membrane module to be equal to or larger than 7.

5. The fuel vapor processing apparatus according to claim 4, wherein the ratio of the flow rate of the fuel vapor containing gas supplied to the separation membrane to the flow rate of a gas permeated through the separation membrane module is controlled to be 7 to 20.

6. A fuel vapor processing apparatus comprising
   a canister capable of adsorbing and collecting a fuel vapor produced within a fuel tank,
   a separation membrane module capable of selectively permeating and separating a fuel component from a fuel vapor containing gas containing the fuel vapor desorbed from the canister,
   a gas supply device capable of pressure-feeding the fuel vapor containing gas from the canister to the separation membrane,
   an electronic control unit capable of controlling a flow rate of the fuel vapor containing gas supplied to the separation membrane; and
   at least one of a permeated gas concentration detecting device and permeated gas flow rate detecting device provided between the separation membrane and the fuel tank, the permeated gas concentration detecting device being capable of detecting the concentration of the fuel vapor contained in a gas permeated through the separation membrane, and the permeated gas flow rate detecting device being capable of detecting the flow rate of the permeated gas;
   wherein the electronic control unit stores therein data relating to permeability and corresponding to the concentration of the fuel vapor contained in the permeated gas or the flow rate of the permeated gas, and
   the electronic control unit controls the flow rate of the fuel vapor containing gas supplied to the separation membrane on the basis of the data relating to permeability and the concentration of the fuel vapor detected by the permeated gas concentration detecting device or the flow rate of the permeated gas detected by the permeated gas flow rate detecting device.

7. The fuel vapor processing apparatus according to claim 6, wherein the electronic control unit is capable of controlling a ratio of the flow rate of the fuel vapor containing gas supplied to the separation membrane to a flow rate of a gas permeated through the separation membrane module to be equal to or larger than 7.

8. The fuel vapor processing apparatus according to claim 7, wherein the ratio of the flow rate of the fuel vapor containing gas supplied to the separation membrane to the flow rate of a gas permeated through the separation membrane module is controlled to be 7 to 20.

9. The fuel vapor processing apparatus according to claim 6, wherein the separation membrane is structured so that a size in a direction in parallel to a flow direction of the supplied gas is configurationally or substantially shorter than a size in a direction perpendicular to the flow direction of the supplied gas.

10. The fuel vapor processing apparatus according to claim 9, wherein the separation membrane comprises a plurality of separation membranes, and the plurality of separation membranes are arranged in parallel from a most-upstream side in a flow path of the supplied gas.

* * * * *